(12) United States Patent
Carey et al.

(10) Patent No.: US 6,748,594 B1
(45) Date of Patent: Jun. 8, 2004

(54) OBJECT MECHANISM AND METHOD FOR RETRIEVING ATTRIBUTE VALUES IN A OBJECT ORIENTED FRAMEWORK

(75) Inventors: James E. Carey, Rochester, MN (US); Brent Allen Carlson, Rochester, MN (US); Tore Dahl, Hasselby (SE); Dale Henry Manthei, Pine Island, MN (US); Anders Mangus Nilsson, Hagan (NO); Torbjorn Pernbeck, Stockholm (SE); Peter Taube, Renningen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/163,053

(22) Filed: Sep. 29, 1998

Related U.S. Application Data

(63) Continuation-in-part of application No. 09/038,349, filed on Mar. 11, 1998, now Pat. No. 6,092,075.

(51) Int. Cl.$^7$ .................................................. G06F 9/00
(52) U.S. Cl. .................... 719/316; 719/315; 707/103 R; 707/103 Y
(58) Field of Search ................................. 709/315, 316, 709/318, 328, 329, 332; 707/103, 101, 104; 719/315, 316, 318, 328, 329, 332

(56) References Cited

U.S. PATENT DOCUMENTS

| | | | | |
|---|---|---|---|---|
| 5,261,098 A | * | 11/1993 | Katin et al. ................. | 395/650 |
| 5,873,093 A | * | 2/1999 | Williamson et al. ........ | 707/103 |
| 5,909,570 A | * | 6/1999 | Webber ....................... | 703/13 |
| 6,018,743 A | * | 1/2000 | Xu .......................... | 707/103 R |
| 6,052,688 A | * | 4/2000 | Thorsen ..................... | 707/100 |
| 6,101,502 A | * | 8/2000 | Heubner et al. ........... | 707/103 |
| 6,182,082 B1 | * | 1/2001 | Tanaka et al. .............. | 707/103 |
| 6,192,476 B1 | * | 2/2001 | Gong ........................ | 713/201 |
| 6,301,584 B1 | * | 10/2001 | Ranger ...................... | 707/103 |
| 6,401,099 B1 | * | 6/2002 | Koppolu et al. ............ | 707/103 |

OTHER PUBLICATIONS

C. J. Date, An Introduction to Database Systems 1982, Addison–Wesley Publishing Company, Third Edition, pp. 6, 87–90 an 117–131.*

* cited by examiner

*Primary Examiner*—Thomas Lee
*Assistant Examiner*—The Thanh Ho
(74) *Attorney, Agent, or Firm*—Martin & Associates L.L.C.; Derek P. Martin

(57) ABSTRACT

In an object oriented computer system, a framework mechanism defines an infrastructure for allowing a user to flexibly define keys and their corresponding attributes. A special type of key called a specification key allows combinations of attributes to be specified, as well as set and range capabilities. An attribute retrieval policy is defined by a programmer to specify an algorithm or criteria that is used to calculating the desired attribute value. An attribute key controller contains key/value pairings for the attribute, contains the attribute retrieval policy, provides a maintenance interface for changing the attribute values; and provides a client interface for retrieving the attribute according to the attribute retrieval policy. The framework thus allows a user great flexibility in defining a suitable key/attribute retrieval mechanism by defining a suitable policy, defining one or more specification keys, and defining an associated controller.

37 Claims, 17 Drawing Sheets

Access Key

| Field | Value |
|---|---|
| Date of Manufacture | 4/16/98 |
| Location of Manufacture | San Jose, CA |
| Inspector | John Quigley |
| Product | 6.8 GB Hard Disk Drive |
| Product Type | Storage Device |
| Serial Number | 472934HD68 |
| Currency | USD |
| Price Group | A |
| Discount Group | B |

FIG. 2

Specification Key

| Field | Value |
|---|---|
| Date of Manufacture | From 2/1/98 to 6/30/98 |
| Location of Manufacture | ALL |
| Inspector | ALL |
| Product | ALL |
| Product Type | ONLY Storage Device |
| Serial Number | ALL |
| Currency | ALL |
| Price Group | ONLY A and C |
| Discount Group | NONE |

FIG. 3

2: if minimum key, set keyable position to ignored; else set to non-specified

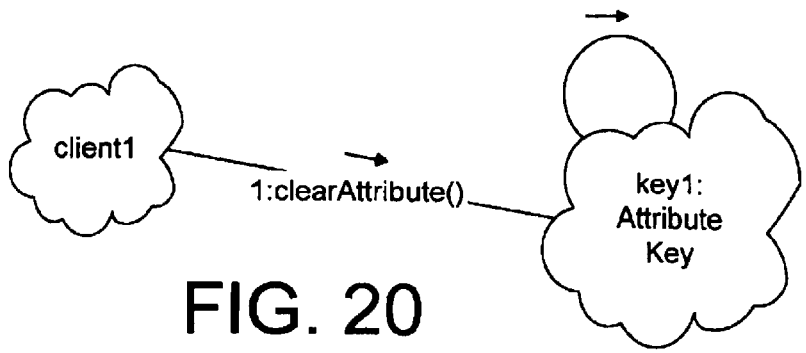

FIG. 20

2: set keyable position to appropriate specific value keyable

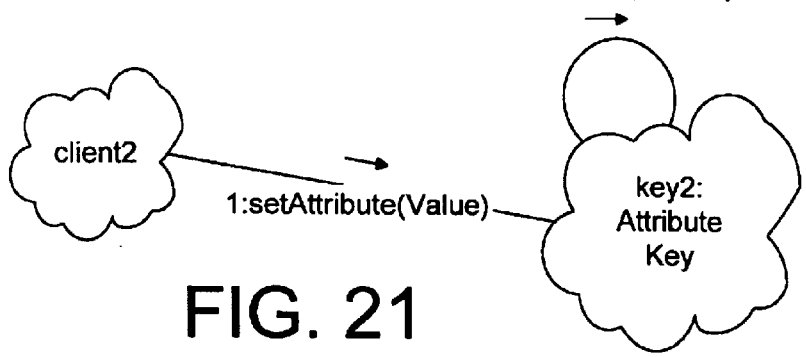

FIG. 21

2: if keyable position is specific value other than not specified, retrieve value and return; else return null

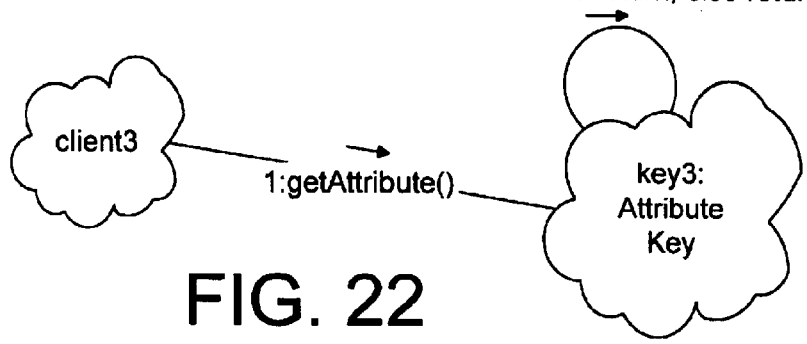

FIG. 22

2: if initial attribute value is non-null, set keyable position to appropriate specific value keyable; else set keyable position to ignored (if minimum key) or not specified (if exact key)

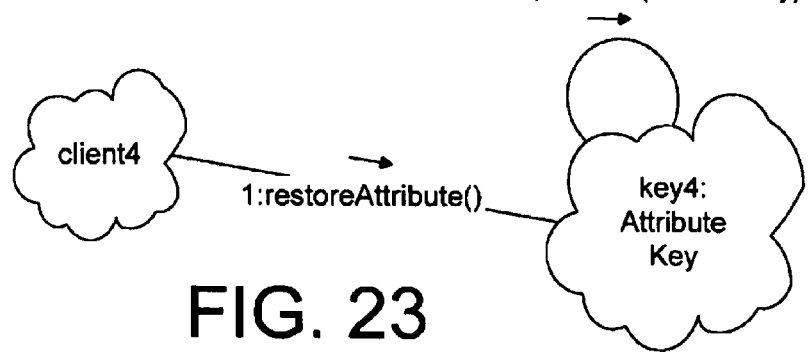

FIG. 23

OBJECT MECHANISM AND METHOD FOR RETRIEVING ATTRIBUTE VALUES IN A OBJECT ORIENTED FRAMEWORK

REFERENCE TO PARENT APPLICATION

This application is a Continuation-In-Part of "Framework for Business Applications Using Cached Aggregate and Specification Key", U.S. Ser. No. 09/038,349, filed Mar. 11, 1998, now U.S. Pat. No. 6,092,075, issued Jul. 18, 2000 which is incorporated herein by reference.

BACKGROUND OF THE INVENTION

1. Technical Field

This invention generally relates to object oriented programming and more specifically relates to a mechanism and method allowing flexible retrieval of attribute values in an object oriented framework.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Frameworks are relatively recent developments in object oriented programming that provide a group of pre-packaged classes and class relationships that are designed to help a user easily extend the framework to write a particular software program, such as a software application. Frameworks typically define certain core functions that cannot be changed by a programmer using the framework, and allow the programmer to extend the framework at defined extension points to generate a custom software application in much less time than coding the software application from scratch.

One capability that is often needed in computer programs is the ability to use one piece of information (or attribute) to retrieve another piece of information (or attribute). This capability is generally known as "keying", where one attribute is used as a "key", or index, to locate and retrieve a different attribute. One known method for keying uses a lookup table that pairs each key to it's corresponding attribute value. When a client program needs to access the attribute value, it uses the corresponding key to locate the attribute value in the lookup table.

Another method for attribute retrieval using keys in an object oriented program could assign attributes to objects, and could implement a sequential search algorithm to search through a sequence of objects until the corresponding attribute is located. While this approach may work for very simplistic programs, it would not be suitable for object oriented programs of any level of significance or complexity due to the performance implications of sequentially searching through a large number of objects to locate an attribute. In addition, this approach is not flexible and cannot easily be adapted to new requirements. For example, storing an attribute in an object does not account for the situation where combinations of attributes need to be represented. Of course, a class could be defined for a combination of two or more attributes. But each combination would require a new class definition. For an object oriented program of any complexity, the number of classes quickly grows to an unacceptable level. And even if a large number of classes are defined for many different combinations, the above method still requires the generation of new classes for each new combination.

Providing classes that represent combinations of attributes might work in an environment where the behavior is predictable. However, when frameworks are used, the behavior of the framework is determined by a programmer that extends the framework to define a software application. It is therefore impossible to pre-determine what combination classes might be needed to define combinations of attributes. Certain aspects of some applications are so variable that providing combination classes in a framework is an unworkable solution. For example, in an order processing framework, the calculation of price or discount will vary widely from one company to the next. What is needed is a flexible way to retrieve attribute values in an object oriented environment. Without improved mechanisms and methods for retrieving attribute values, the computer industry will continue to suffer from object oriented frameworks that do not provide the desired flexibility, functionality, and performance.

DISCLOSURE OF INVENTION

In an object oriented computer system, a framework mechanism defines an infrastructure for allowing a user to flexibly define keys and their corresponding attributes. A special type of key called a specification key allows combinations of attributes to be specified, as well as set and range capabilities. An attribute retrieval policy is defined by a programmer to specify an algorithm or criteria that is used to calculating the desired attribute value. An attribute key controller contains key/value pairings for the attribute, contains the attribute retrieval policy, provides a maintenance interface for changing the attribute values; and provides a client interface for retrieving the attribute according to the attribute retrieval policy. The framework thus allows a user great flexibility in defining a suitable key/attribute retrieval mechanism by defining a suitable policy, defining one or more specification keys, and defining an associated controller.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is an illustration of one specific example of an access key;

FIG. 3 is an illustration of one specific example of a specification key that has the same key components as the access key of FIG. 2;

FIG. 20 is an object diagram showing how an attribute key is cleared;

FIG. 21 is an object diagram showing how an attribute key is set;

FIG. 22 is an object diagram showing how an attribute key is retrieved;

FIG. 23 is an object diagram showing how an attribute key is restored to its previous state;

BEST MODE FOR CARRYING OUT THE INVENTION

Figure 1:
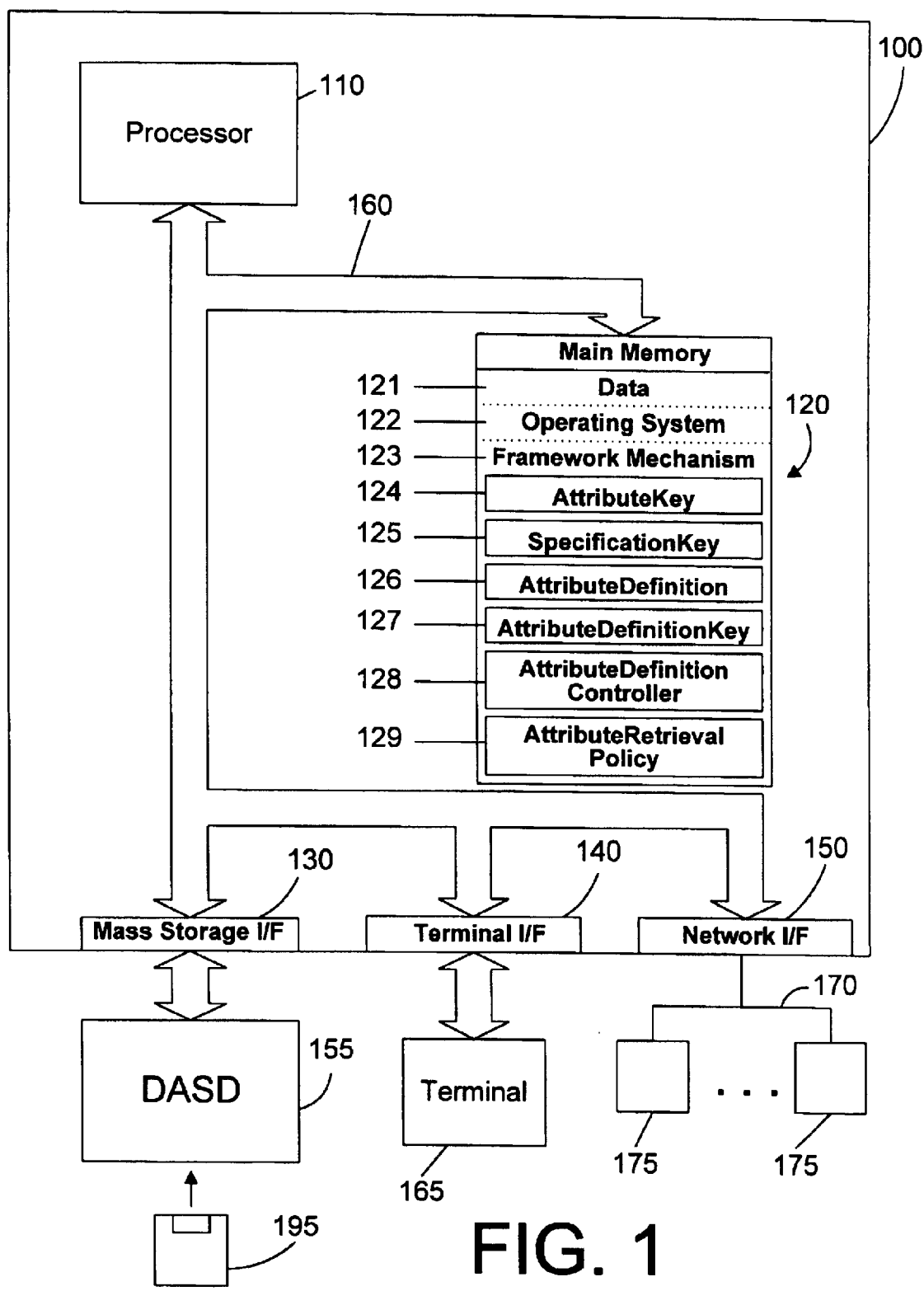
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages .that support object oriented programming to one degree or another.

The Term Framework

There has been an evolution of terms and phrases which have particular meaning to those skilled in the art of OO design. However, the reader should note that one of loosest definitions in the OO art is the definition of the word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible finction of the framework (i.e., that part of the framework that is to be subject to potential customization and extension). In the end, the ultimate worth of a framework mechanism rests not only on the quality of the object design, but also on the design choices involving which aspects of the framework represent core finction and which aspects represent extensible finction.

Access Keys

Access keys are known in the art to be keys that uniquely identify a particular input of interest. For example, in an order processing environment, an access key is assigned to each product that may be ordered. An access key typically defines a number of fields that correspond to the input of interest. For example, referring to FIG. 2, an access key is shown that defines nine different inputs: 1) Date of Manufacture; 2) Location of Manufacture; 3) Inspector; 4) Product; 5) Product Type; 6) Serial Number; 7) Currency; 8) Price Group, and 9) Discount Group. Note that for each of these nine fields, there is corresponding data that uniquely identifies the product of interest. The fields in FIG. 2 indicate that the product was manufactured on Apr. 16, 1998; that it was manufactured in San Jose, Calif.; that it was inspected by John Quigley; that it is a 6.8 gigabyte hard disk drive; that a hard disk drive is a storage device; that the serial number is 42934HD68; that the currency is in U.S. dollars (USD); that the price group is group A; and that the discount group is group B. An access key thus provides a way to index information of interest to allow searching and retrieval of products according to their indexed information.

Specification Keys

Access keys, while useful, only allow one parameter per input field. A new concept, known as a specification key, was introduced in "Framework for Business Applications Using Cached Aggregate and Specification Key", U.S. Ser. No. 09/038,349, filed Mar. 11, 1998, which is the parent application to this patent application. A specification key can be used as an indexing mechanism for attribute retrieval that provides flexibility by enabling more complex mechanisms such as support for time ranges that an access key cannot support. For example, a specification key may retrieve different prices in different date ranges. An access key, in contrast, can only specify a single date. Also, a specification key allows arbitrary grouping of attributes. For example, customers A, B and C can all be given the same price, while customers D and E each get different prices. A specification key provides extensibility by allowing an application developer to add additional inputs of interest for retrieval of a particular attribute. For example, an application may want to introduce time periods when retrieving lead time for a particular supplier because past history with that supplier indicates a delay will likely occur during certain months of the year. Another example is that an application may want to be able to vary prices according to the warehouse the product will be shipped from. These types of changes are made by extending the framework that defines the specification key class by subclassing appropriate classes in the framework, thereby localizing the impact of changes to the existing business process components and application code without affecting the core finction of the framework.

Specification keys support specific types of inputs, referred to herein as specification keyables. One type of specification keyable is known as a specific value keyable. With a specific value keyable, only one specific value of a given item is included. A specific value keyable corresponds to the type of information that may be stored in a typical access key—single pieces of information. Other specification keyables include: all values keyable, ignored keyable, dynamic set keyable, and range keyable. An all values keyable is an input that specifies that all entries in the corresponding field are valid. An ignored keyable is an input that is ignored, regardless of its value. A dynamic set keyable is an input that specifies a set of information. A range keyable is an input that specifies range for ordinal data, such as dates, serial numbers, and any other data that may be ordered.

Note that these keyables may be combined as appropriate to arrive at new, more sophisticated keyables. For example, the dynamic set keyable and range keyable may be combined to define a dynamic set and range keyable. In addition, specific cases of these keyables may be defined. For example, a date keyable may be defined as a special case of range keyable. One skilled in the art will recognize from the description above that a vast array of keyables may be defined within the scope of the present invention, which expressly extends to any and all keyable definitions that may be used to define a specification key.

One suitable example of a specification key is shown in FIG. 3. The specification key of FIG. 3 corresponds to the access key shown in FIG. 2, and thus includes the same fields or inputs. Note, however, that the values in these fields in the specification key may include ranges, sets, or other combinations rather than a single value by defining these fields as range keyables, dynamic set keyables, or other combination keyables. The specification key of FIG. 3 specifies a date range of Feb. 1, 1998 to Jun. 30, 1998 for the date of manufacture; ALL locations of manufacture; ALL inspectors; ALL products; ONLY products of the storage device product type; ALL serial numbers; ALL currencies; ONLY price groups A and C; and no discount group (NONE).

Specification keys may be compared to determine if they match according to pre-determined criteria. For example, let's assume that a specification key has the same values as the access key of FIG. 2. For this specific example, each input is a specific value keyable with the values shown in FIG. 2. Whether a specification key with values as shown in FIG. 2 matches the specification key of FIG. 3 depends on the type of match that is required between the two. Note that all the values in FIG. 2 fall within the values and ranges in the specification key of FIG. 3, with the exception of the discount group. FIG. 2 specifies a discount group of B, while the specification key of FIG. 3 specifies no discount group. We present here the concept of exact matches and minimal matches. An exact match requires that each keyable in the one specification key satisfy each keyable in a second specification key. Thus, if an exact match is required, a specification key with the values of FIG. 2 would not be an exact match with the specification key of FIG. 3. However, it is possible to specify matches where certain fields are marked as "ignore" or "don't care". If a minimal match were requested, with the discount group specified as "ignore", then a specification key with the values of FIG. 2 will be a minimal match with the specification key of FIG. 3, because the mismatch of the discount group is ignored. The concept of exact and minimal matches allows great flexibility in configuring a keyed attribute retrieval system, and is explained in greater detail below.

2. Detailed Description

According to a preferred embodiment of the present invention, a mechanism and method provide a very flexible way for an application developer to define keys and to retrieve attribute values based on those keys. This mechanism is shown in the figures and described in the preferred embodiments that follow, as part of an object oriented framework. However, the same mechanisms and methods may be employed in any object oriented program, whether created with a framework or not.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 121, an operating system 122, and an object oriented framework mechanism 123 in accordance with the preferred embodiments. Framework 123 includes one or more of each of the following: AttributeKey 124, SpecificationKey 125, AttributeDefinition 126, AttributeDefinitionKey 127, AttributeKeyController 128, and AttributeRetrievalPolicy 129. The collection of these items 124–129 within the framework collectively comprise a keyed attribute retrieval mechanism.

AttributeKey 124 is a key that contains one or more domain attributes that correspond to another attribute of interest in the framework 123, and is a subclass of SpecificationKey 125. SpecificationKey 125 corresponds to the specification key discussed in the Overview section above. AttributeDefinition 126 associates one or more additional domain attributes with the attribute of interest. AttributeDefinitionKey 127 is a subclass of SpecificationKey 125 and defines a key for the AttributeDefinition 126. AttributeDefinitionController 128 contains all the key/value pairings, contains the AttributeDefinition, and contains an appropriate AttributeRetrievalPolicy 129. AttributeRetrievalPolicy defines an algorithm or criteria for retrieving the attribute of interest. Note that these various components 124–129 of framework 123 may reside in main memory 120 as classes, or each may also exist as an instance of its corresponding class.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and framework mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system. Operating system 122 preferably supports an object oriented programming environment such as that provided, for example, by the Java programming language.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the items shown in main memory 120 need not necessarily all reside on computer system 100. For example, one or more portions shown in main memory 120 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 4:
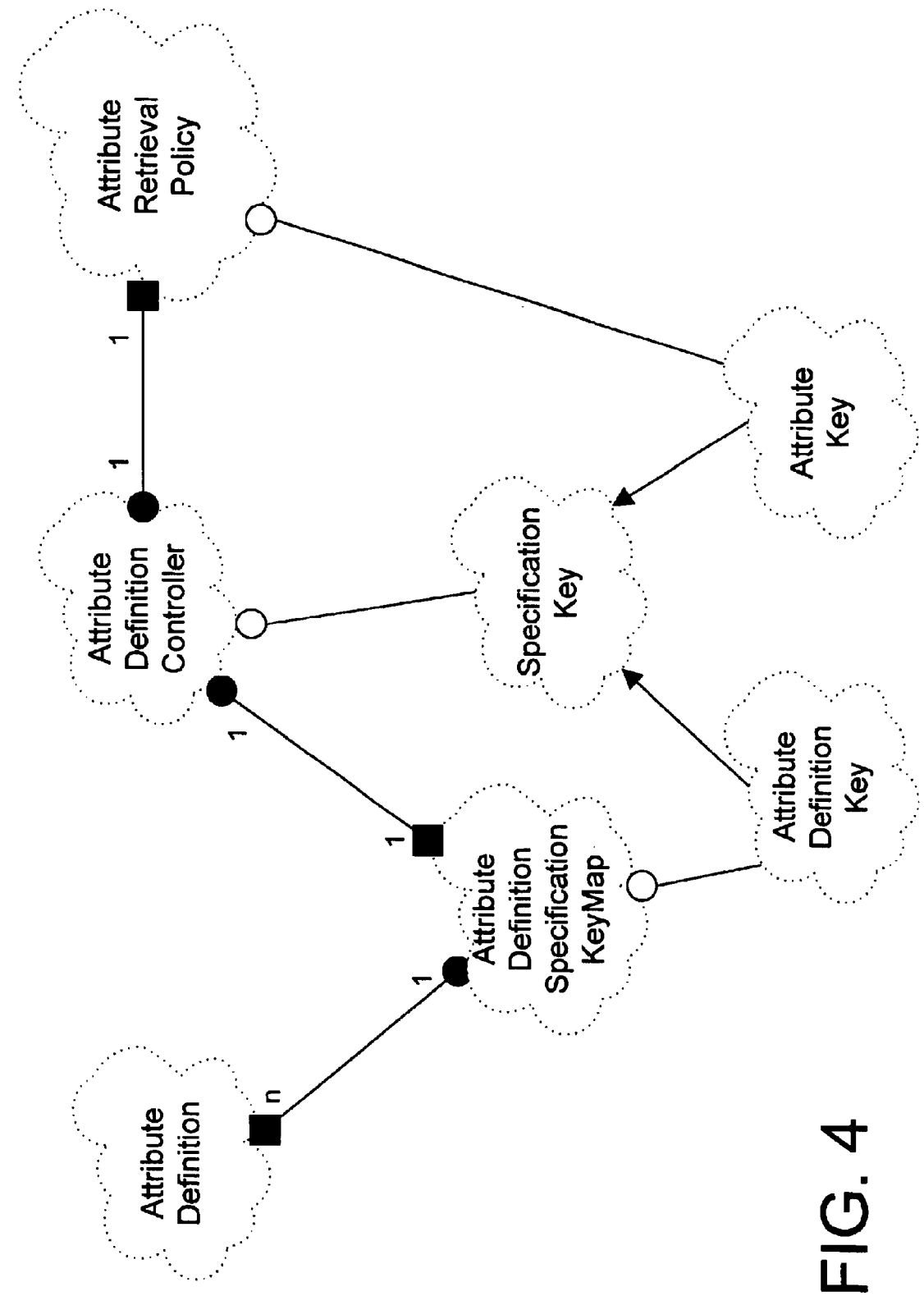
FIG. 4 is a class diagram of a portion of a framework showing the classes that implement the attribute retrieval mechanism in accordance with a preferred embodiment.

Referring to FIG. 4, a framework 123 in accordance with the preferred embodiment defines the SpecificationKey class described-above. In addition, an AttributeKey class and an AttributeDefinitionKey class are defined as subclasses of SpecificationKey. An AttributeRetrievalPolicy class is defined, which is typically implemented by the user of the framework to define a suitable algorithm or criteria (i.e., policy) for retrieving the corresponding attribute. One suitable way to implement the AttributeRetrievalPolicy is through defining concrete subclasses that implement the methods declared by the base policy class and which are needed to carry out the desired policy. An AttributeDefinition class is defined, which associates one or more additional domain attributes with the attribute of interest. An AttributeDefinitionSpecificationKeyMap class defines a key map, which is a pairing of keys with their associated attribute values. An AttributeDefinitionController class is also defined with a contains relationship with the AttributeRetrievalPolicy class and the AttributeDefinitionSpecificationKeyMap class, indicating that the AttributeDefinitionController class contains each of the AttributeRetrievalPolicy and AttributeDefinitionSpecificationKeyMap classes.

The AttributeRetrievalPolicy class is a domain-specific policy that determines how attributes are retrieved. For example, the AttributeRetrievalPolicy may specify that an exact match be tried first, and if not match is found, a minimal match can then be attempted. While the AttributeRetrievalPolicy is shown herein as a single object in the preferred embodiment, the present invention extends to any combination of classes or objects that perform the function of providing domain-specific information regarding how attributes are to be retrieved. One suitable variation could use a chain of responsibility policy scheme, such as that disclosed in U.S. Ser. No. 09/038,352 "Method of Using Decoupled Chain of Responsibility", filed Mar. 11, 1998.

The AttributeDefinition class bundles the attribute being retrieved with the inputs used to retrieve the attribute. Instances of this class are maintained by the AttributeDefinitionController. The attributes of an AttributeDefinition object are set during object creation and cannot be modified once the object is created.

Instances of the AttributeDefinition class are typically copies rather than independent object instances. This is done to allow applications to preserve the contents of a retrieved AttributeDefinition class object even though the value associated with that AttributeDefinition class object might be changed in the future. This behavior is important for domain uses such as order management where, for example, the price established with a customer is effectively a contract with that customer and should not be allowed to change automatically when prices are increased. If there is no need to remember the original state of the AttributeDefinition object, the AttributeDefinition class could be implemented as an independent business object.

The AttributeKey and AttributeDefinitionKey are both subclasses of the SpecificationKey class. The AttributeKey class is used to retrieve attribute values from the AttributeDefinitionController. The AttributeDefinitionKey class is used when maintaining the contents of the AttributeDefinitionController.

Figure 10:
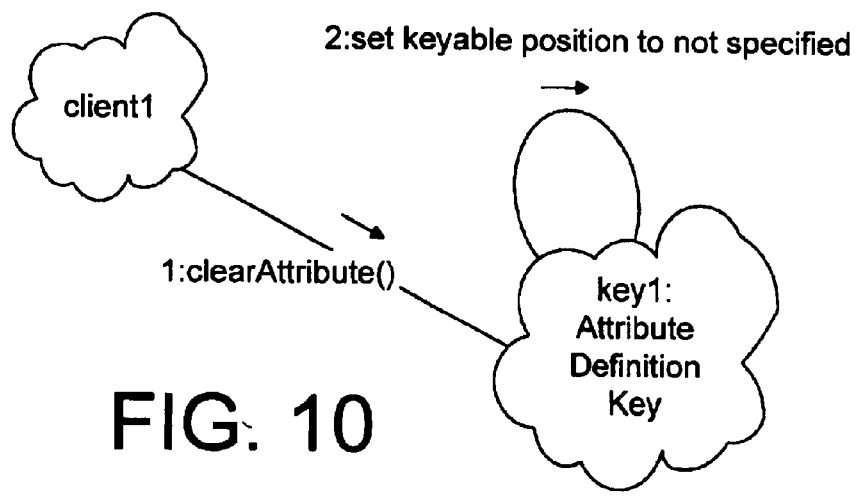
FIG. 10 is an object diagram showing how an attribute definition key is cleared.
Figure 11:
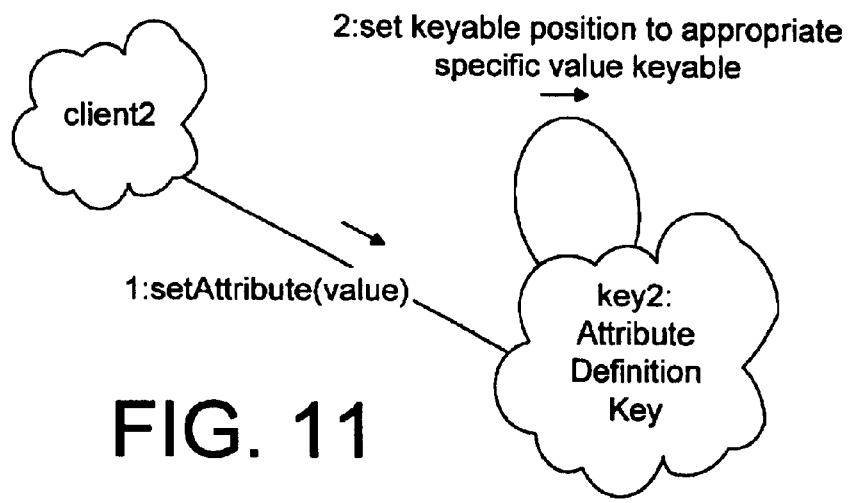
FIG. 11 is an object diagram showing how an attribute definition key is set.
Figure 12:
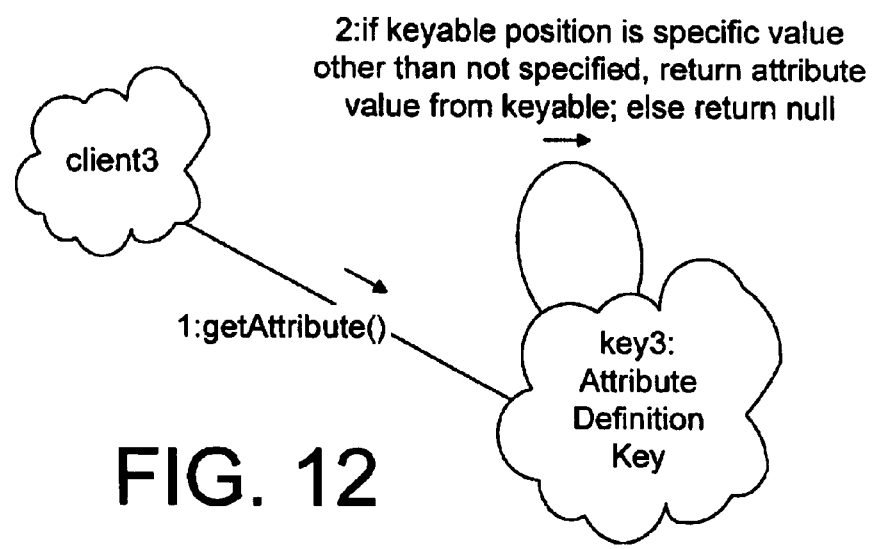
FIG. 12 is an object diagram showing how an attribute definition key is retrieved.

The AttributeDefinitionKey provides domain-specific interfaces to clear, set, and get inputs associated with each attribute defined on the AttributeDefinition class. These interfaces are represented by the clearAttribute( ), setAttribute( ), and getAttribute( ) methods, as shown in FIGS. 10–12. In the case of an order processing system, for example, that needs to compute lead time, these methods allow a client to clearWarehouse/setWarehouse/getWarehouse, clearSupplier/setSupplier/getSupplier, clearProduct/setProduct/getProduct, etc. As discussed above in the Overview section dealing with specification keys, a specification key can include set and range inputs. Because the AttributeDefinitionKey is a subclass of the SpecificationKey class, the AttributeDefinitionKey class may define clear, set and get methods for ranges and sets as well as for specific value keyables. An instance of AttributeDefinitionKey is created before a new instance of the AttributeDefinition class is created, and the instance of AttributeDefinitionKey is used to verify that the AttributeDefinition class instance does not already exist. Instances of the AttributeDefinitionKey class are also used during maintenance of the AttributeDefinitionController to retrieve and replace already existing AttributeDefinitions.

The AttributeKey class provides domain-specific interfaces to clear, set, get, and restore inputs of interest, as well as mechanisms to convert the AttributeKey for use during exact or minimum matching retrieval. These conversion interfaces preserve the original inputs of interest for repeated use, thus allowing inputs to be temporarily cleared or set and then restored. The AttributeKey class also provides a mechanism that allows the client to reinitialize an instance of the class with new inputs of interest. Note that reinitializing an AttributeKey is different than reusing an AttributeKey. An AttributeKey can be reused multiple times without being reinitialized, usually by restoring the key and then making temporary modifications to it. In contrast, reinitializing an AttributeKey changes the values that are used when that key is restored. When a client wishes to retrieve an attribute value or values for use in the application (as opposed to maintenance of attribute values), it creates an instance of the AttributeKey and passes that instance on the AttributeDefinitionController's retrieval interface (for example, getLeadTimeDefinition( )).

The AttributeDefinitionController class encapsulates a specification key map and uses the functions provided by this map to support exact and minimum matching retrieval mechanisms. The AttributeDefinitionController class also provides a primary retrieval interface as mentioned above (for example, getLeadTimeDefinition( )) which accepts as input an AttributeKey object and passes that object to the AttributeRetrievalPolicy class, whose implementation can be easily varied by an application developer through, subclassing. A typical implementation of an AttributeRetrievalPolicy subclass uses the exact and/or minimum matching retrieval mechanisms to retrieve attribute values with various combinations of input values. For example, if inputs for Product, Warehouse, and Supplier are provided by the client, a subclass implementation of AttributeRetrievalPolicy may only attempt to retrieve the attribute value associated with an exact match of all three inputs. On the other hand, it may first attempt to retrieve the attribute value using an exact match for the Product input only, then Product and Warehouse inputs using an exact match, and finally Product and Supplier inputs using a minimum match.

Exact match and minimum match are defined as shown in Tables 1.1 and 1.2.

TABLE 1.1

Criteria for Exact Match

| Type of Input | Exact Match Criteria |
| --- | --- |
| Non-time inputs | Value passed in AttributeKey for a particular input must match exactly (including null) the value contained by the AttributeDefinition object for that input. |
| Time Inputs | Time value on the passed AttributeKey must be within the range of from time-to time on the definition object. If time is not passed, time ranges are ignored during retrieval. |

TABLE 1.2

Criteria for Minimum Match

| Type of Input | Minimum Match Criteria |
| --- | --- |
| Non-time inputs | If the passed AttributeKey has a null value for a particular input, that input is ignored during comparison. If the passed AttributeKey has a non-null value, the AttributeDefinition object must contain that value to be considered a match (i.e., if the AttributeDefinition object has null for that input, this is considered to not be a match). |
| Time Inputs | Time value on the passed AttributeKey must be within the range of from time-to time on the definition object. If time is not passed, time ranges are ignored during retrieval. |

Because the primary retrieval interface on the AttributeDefinitionController class accepts an AttributeKey as an input parameter, the application developer can easily extend the interface by subdlassing the AttributeDefinition class, AttributeKey class, and AttributeDefinitionKey class to add additional input parameters. The application developer can also add more complex handling of existing input parameters by changing the internal key mechanism used by the AttributeKey class for a particular input. For example, the AttributeDefinitionKey class could define range or dynamic set keyables instead of specific value keyables. All such changes are encapsulated within the implementation of the AttributeKey class, the AttributeDefinitionKey class, and the AttributeDefinition class, and the mechanisms for complex input parameter handling are provided by the base SpecificationKey class and the AttributeDefinitionController class implementations.

In the example shown in Table 1.3, the product, the customer, and the time period are used as inputs when retrieving discounts. A DiscountDefinitionController, which is a concrete implementation of AttributeDefinitionController shown in FIG. 4, could be populated as follows (where the first column is added only for ease of reference in the example):

TABLE 1.3

Example of AttributeDefinitionController data

| # | Product | Customer | Time Period | Discount |
|---|---------|----------|-------------|----------|
| 1 | baseball | Joseph | 1/1–5/31 | 10% |
| 2 | baseball | Joseph | 6/1–6/2 | 3% |
| 3 | baseball | Joseph | 6/3–12/31 | 24% |
| 4 | any product | Joseph | 1/1–7/31 | 7% |
| 5 | any product | Joseph | 8/1–12/31 | 6% |

With this definition we could retrieve discounts in the following ways:

A) Joseph wants to buy a baseball on 12/30
   (A1) Try to find an exact match (key=baseball, Joseph, 12/30), which returns 24% (#3)

B) Joseph wants to buy a soccer ball on 3/21
   (B1) Try to find an exact match (key=soccer ball, Joseph, 3/21), which fails. (None of the products are exactly soccer ball).
   (B2) Try to find a minimum match (key=null, Joseph, 3/21), which returns 7% (#4)

C) Joseph wants to buy a baseball on 6/2
   (C1) Get all applicable discounts using minimum match (key=null, Joseph, 6/2), which returns 3% (#2), and 7% (#4).
   (C2) Return the best discount found (7% in this case), or alternatively return all discounts found (3% and 7% in this case).

This very simple example shown in Table 1.3 and discussed above illustrates how a framework that implements the appropriate classes can provide core function that retrieves attributes according to policies, keys, and definitions defined at the domain level, in the extensible function of the framework.

Figure 5:
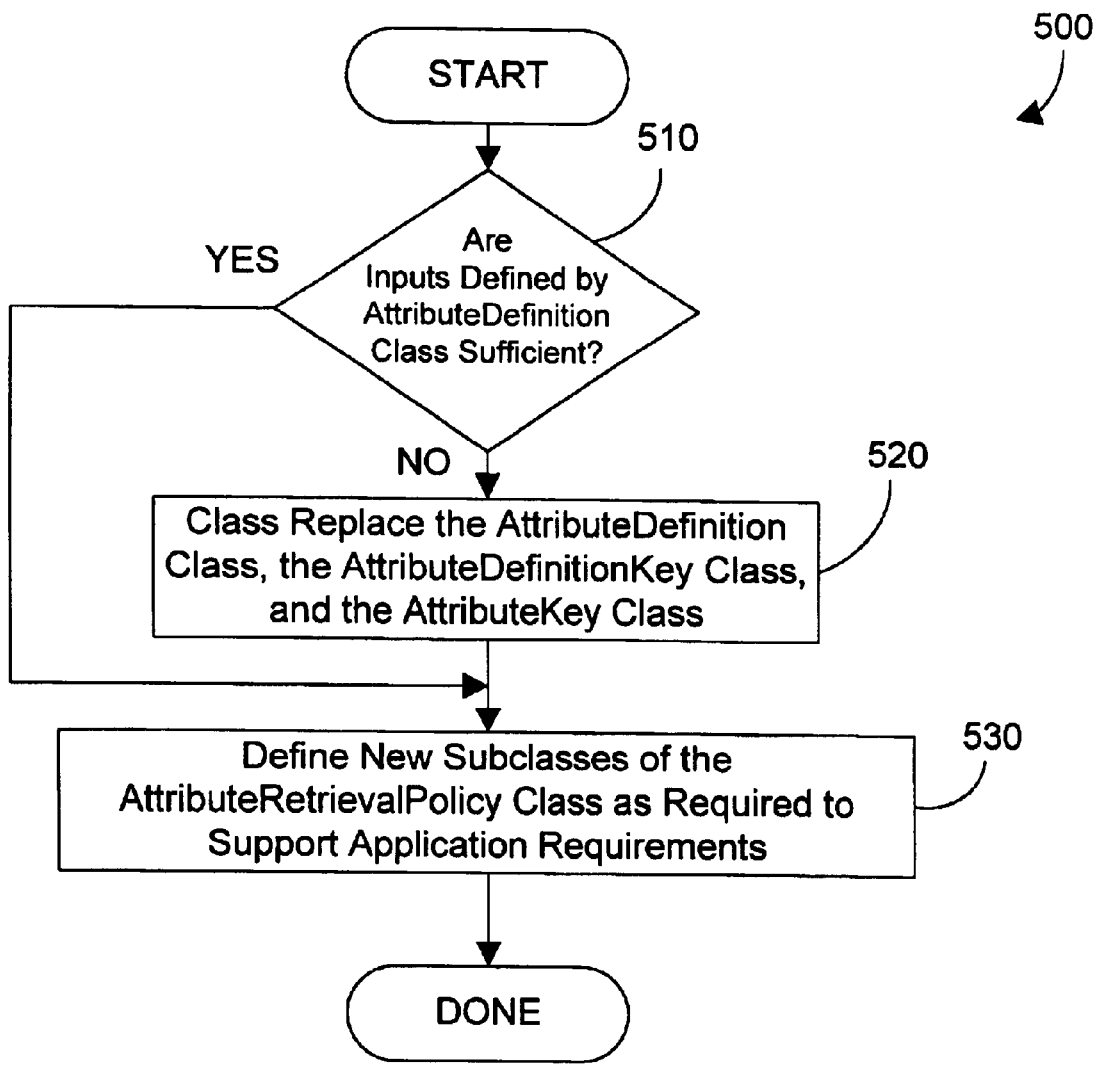
FIG. 5 is a flow diagram showing the steps in implementing the mechanism within a framework in accordance with the preferred embodiments.

Referring to FIG. 5, a method 500 for extending a framework 123 in accordance with a preferred embodiment starts by determining whether the inputs defined by the AttributeDefinition class that is supplied with the framework are sufficient (step 510). If so (step 510=YES), the framework may be extended without performing any class replacements. If not (step 510=NO), the application developer must class replace the AttributeDefinition class, the AttributeDefinitionKey class, and the AttributeKey class to provide the required inputs (step 520). Once the framework has the appropriate classes defined, the application developer can then extend the framework to define the application by defining new subclasses of the AttributeRetrievalPolicy class as required by the application (step 530).

Figure 6:
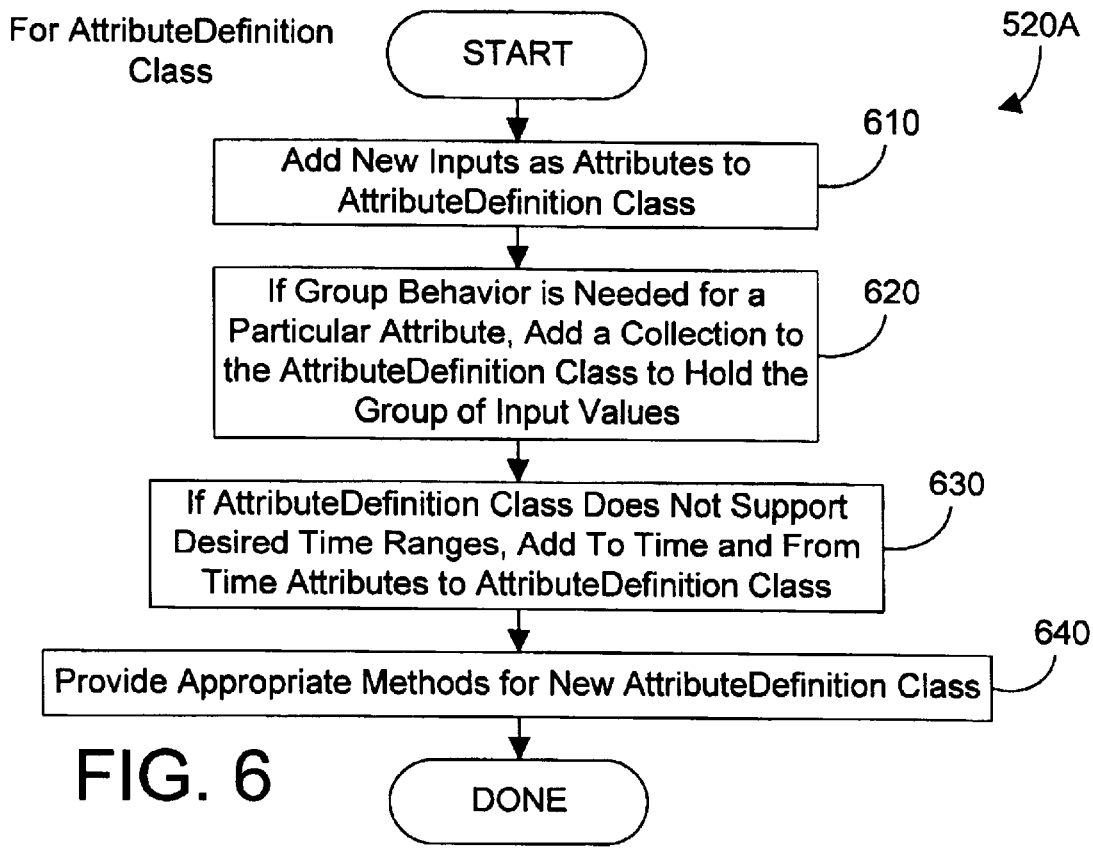
FIG. 6 is a flow diagram showing the steps in performing class replacement of the AttributeDefinition class in step 520 of FIG. 5.
Figure 7:
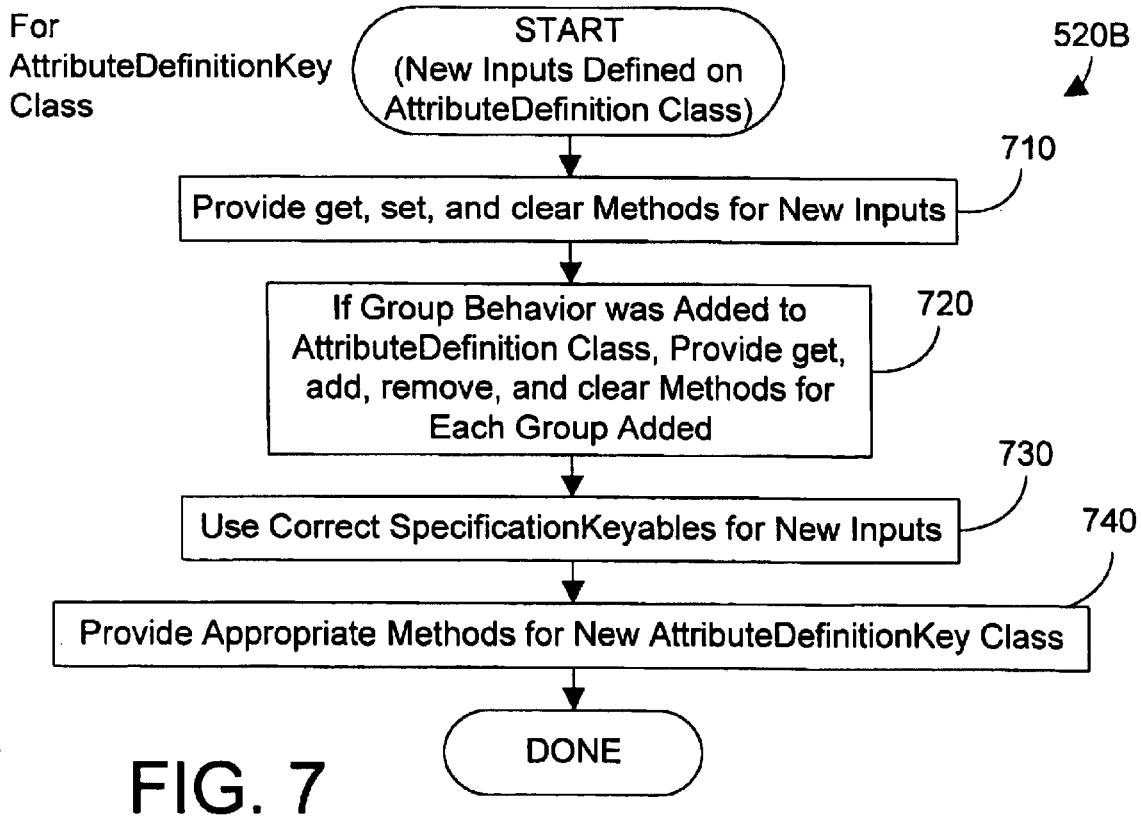
FIG. 7 is a flow diagram showing the steps in performing class replacement of the AttributeDefinitionKey class in step 520 of FIG. 5.
Figure 8:
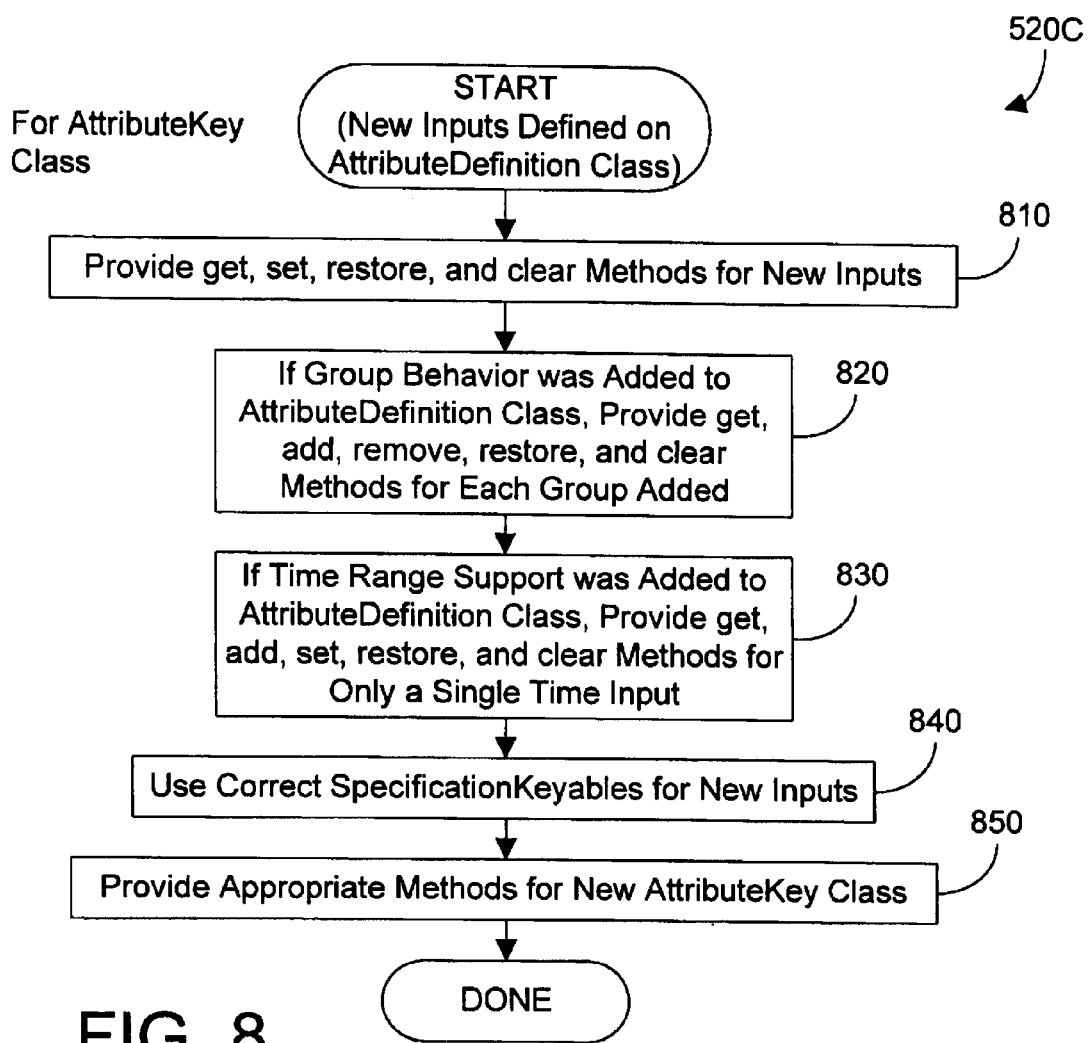
FIG. 8 is a flow diagram showing the steps in performing class replacement of the AttributeKey class in step 520 of FIG. 5.

Step 520 in FIG. 5 may be broken down into sub-steps, as shown in the flow diagrams of FIGS. 6–8. The flow diagram 520A of FIG. 6 represents the portion of step 520 in FIG. 5 that performs class replacement for the AttributeDefinition class. First, any new inputs that are needed are added as attributes to the AttributeDefinition class (step 610). For example, if the AttributeDefinition class did not include an input for a product's manufacturing lot, this lot input would be added to the AttributeDefinition class in step 610. Next, if group behavior is needed for a particular attribute, a collection is added to the AttributeDefinition class to hold the group of input values (step 620). Then, if the AttributeDefinition class does not support time ranges that are needed, the toTime and fromTime attributes are added to the AttributeDefinition class to support these time ranges (step 630). Finally, appropriate methods are defined for the newly defined AttributeDefinition class (step 640). These methods suitably include methods to create, initialize, and validate the AttributeDefinition class.

The flow diagram 520B of FIG. 7 represents the portion of step 520 in FIG. 5 that performs class replacement for the AttributeDefinitionKey class. This method begins once new inputs are defined on the AttributeDefinition class, discussed in step 610 of FIG. 6. First, methods for the new inputs added in step 610 are defined on the AttributeDefinitionKey class that get, set, and clear attributes that do not have group (set) behavior. Thus, for the example above where the manufacturing lot was added to the AttributeDefinition class in step 610, methods getLot( ), setLot( ), and clearLot( ) are defined on the AttributeDefinitionKey class in step 710, and other methods may be added as required to support set attributes. Next, if group behavior was added to the AttributeDefinition class in step 620, methods that get, add, remove and clear each added group are provided on the AttributeDefinitionKey class (step 720). The next step is to use the correct specification keyables for the new inputs defined in step 610 (step 730). For example, the manufacturing lot input would be a specific value keyable. Any time inputs would be range keyables, and any group inputs would be dynamic set keyables. The final step is to provide appropriate methods on the newly-defined AttributeDefinitionKey class (step 740). These methods suitably include methods to create, initialize, and validate the AttributeDefinitionKey. Note that the initialize method must increase the number of keyables in the AttributeDefinitionKey to accommodate the new inputs defined in step 610.

The flow diagram 520C of FIG. 8 represents the portion of step 520 in FIG. 5 that performs class replacement for the AttributeKey class. This method begins once new inputs are defined on the AttributeDefinition class, discussed in step 610 of FIG. 6. First, methods for the new inputs added in step 610 are defined on the AttributeKey class that get, set, restore, and clear these new inputs. Thus, for the example above where the manufacturing lot was added to the AttributeDefinition class in step 610, methods getLot( ), setLot( ), restoreLot( ), and clearLot( ) are defined on the AttributeKey class in step 810. Next, if group behavior was added to the AttributeDefinition class in step 620, methods that add, remove, restore, and clear each added group are provided on the AttributeKey class (step 820). Note that for the preferred embodiment, group behavior is generally not added to the AttributeKey class because lookup of attributes is generally performed using single key values, but the ability to add group behavior to the AttributeKey class is included at step 820 of FIG. 8 for the sake of completeness. If time range support was added to the AttributeDefinition class in step 630, methods are defined on the AttributeKey class that get, add, set, restore, and clear a single time input (step 830). The next step is to use the correct specification keyables for the new inputs defined in step 610 (step 840). The final step is to provide appropriate methods on the newly-defined AttributeKey class (step 850). These methods suitably include methods to create, initialize, re-initialize, and validate the AttributeKey class. Note that the initialize method must increase the number of keyables in the AttributeKey to accommodate the new inputs defined in step 610.

Figure 9:
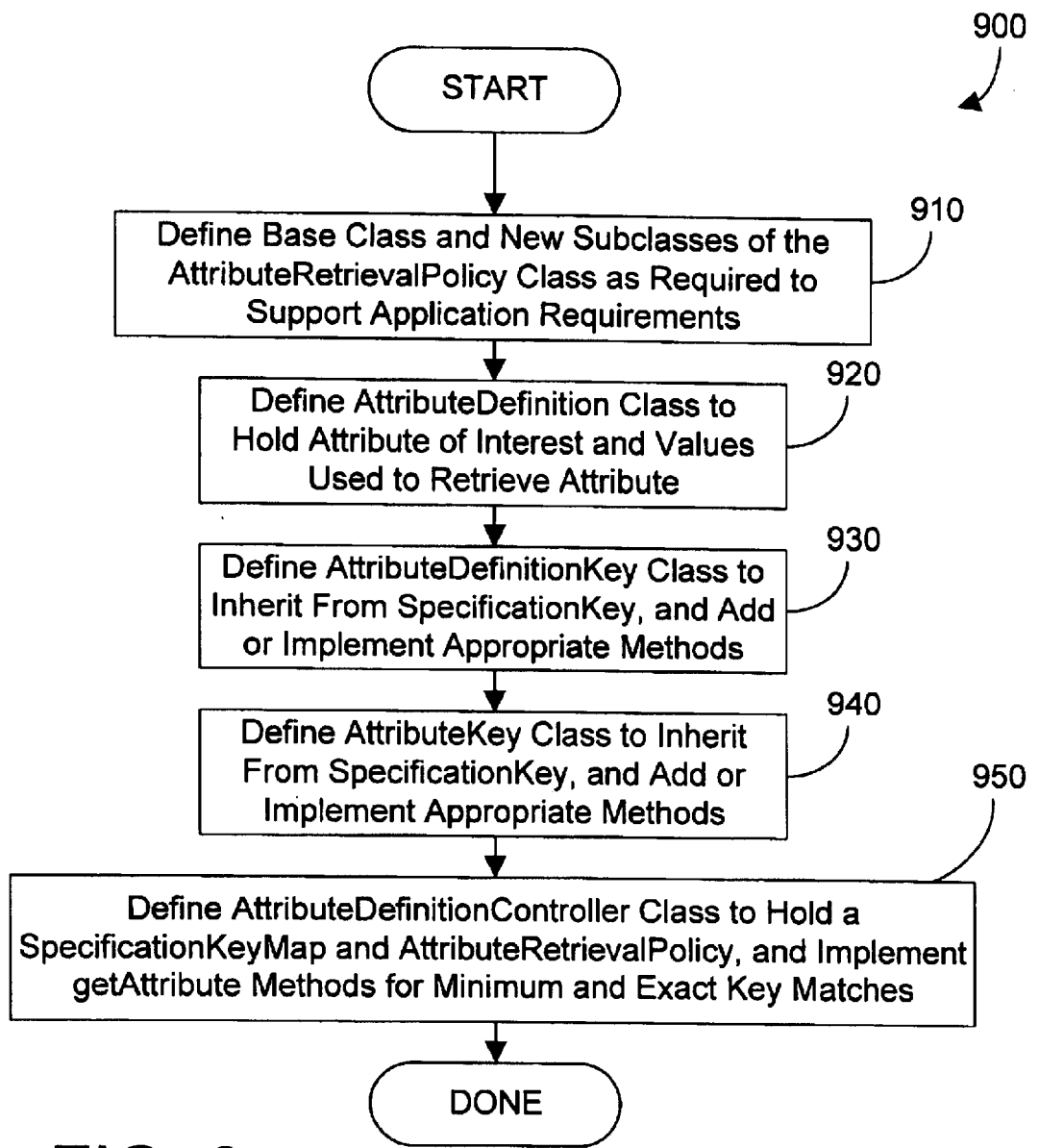
FIG. 9 is a flow diagram showing the steps in adding new behavior to the framework of the present invention.

Method 500 as described above assumes that the framework defines behavior that may be used by a programmer by extending the framework through class replacement and subclassing. However, it may be that a programmer needs behavior that is not defined in the framework, and must therefore create the needed behavior that uses core functions that the framework provides. Referring to FIG. 9, a method 900 for defining new behavior within the framework starts by defining the new base class and the subclasses of the AttributeRetrievalPolicy class to define the algorithm or criteria to support the application requirements (step 910). In step 920, an AttributeDefinition class is defined that holds the attribute of interest and that holds values used to retrieve the attribute of interest. In step 930, an AttributeDefinition-Key class is defined as a subclass of SpecificationKey, with appropriate methods to access the attribute value based on rules defined for subclasses of SpecificationKey. For non-group attributes, methods that get, set, and clear the attribute are preferably provided. For group attributes, methods that get, add, remove, and clear the group attributes are preferably provided. Other methods may be defined as required to perform other detailed steps not specifically discussed herein.

In step 940, the AttributeKey class is defined as a subclass of SpecificationKey, with appropriate methods to access the attribute value based on rules defined for subclasses of SpecificationKey. For non-group attributes, methods that get, set, restore and clear the attribute are preferably provided. For group attributes, methods that get, add, remove, and clear the group attributes are preferably provided. Other methods may be defined as required to perform other detailed steps not specifically discussed herein.

The final step of method 900 is to define an AttributeDefinitionController class that holds the AttributeDefinition and the AttributeRetrievalPolicy classes just defined (step 950). In addition, step 950 defines methods that provide a client interface for retrieving attribute values, as well as a method that retrieves the attribute values based on an exact match, and another method that retrieves the attribute values based on a minimal match. The exact match and minimum match retrieval methods are suitably used by the AttributeRetrievalPolicy as required.

The implementation of the clear, set, and get methods for new single value keyables on the AttributeDefinitionKey class that are defined in step 710 of FIG. 7 is shown in FIGS. 10–12. Referring to FIG. 10, when the clearAttribute( ) method is invoked on an instance of AttributeDefinitionKey (step 1), the instance sets the keyable position corresponding to the attribute to "not specified" (step 2). This effectively "clears" the attribute. Referring to FIG. 11, when the setAttribute( ) method is invoked on an instance of AttributeDefinitionKey (step 1), the instance sets the keyable position corresponding to the attribute to the specific attribute value passed in as a parameter to the setAttribute method call (step 2), effectively "setting" the attribute value. Referring to FIG. 12, when the getAttribute( ) method is invoked on an instance of AttributeDefinitionKey (step 1), the instance determines in step 2 whether the keyable position is a specific value other than "not specified", and if so, it returns the attribute value from the keyable. Otherwise, it returns null. Of course, the object and method names in FIGS. 10–12 are presented for a general understanding of the mechanisms that apply to clearing, setting and getting attributes for an instance of any AttributeDefinitionKey class. In reality, the method and class names will probably be specific to specific attributes. For example, the AttributeDefinitionKey in FIGS. 10–12 could be replaced with a PriceDefinitionKey if price is the relevant attribute of interest. In this specific example, the corresponding methods would be clearPrice( ), setPrice( ), and getPrice( ). The AttributeDefinitionKey and its associated methods may thus be adapted for any suitable input.

Figure 13:
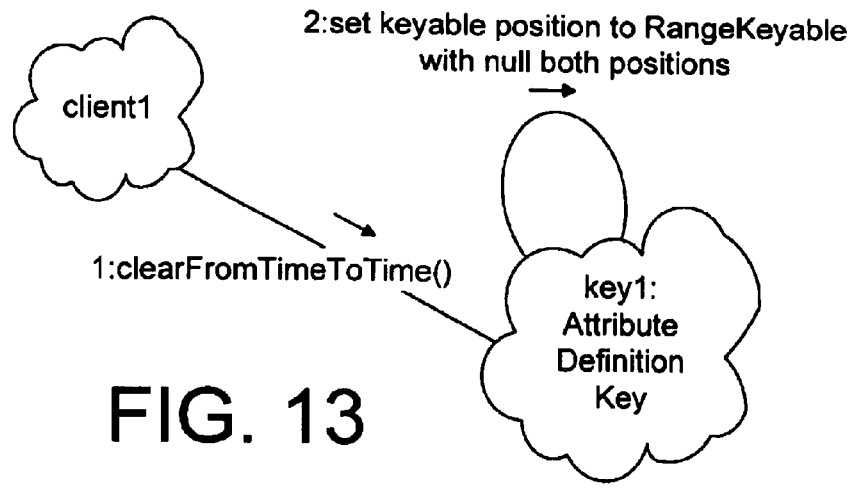
FIG. 13 is an object diagram showing how a time range attribute on an attribute definition key is cleared.
Figure 14:
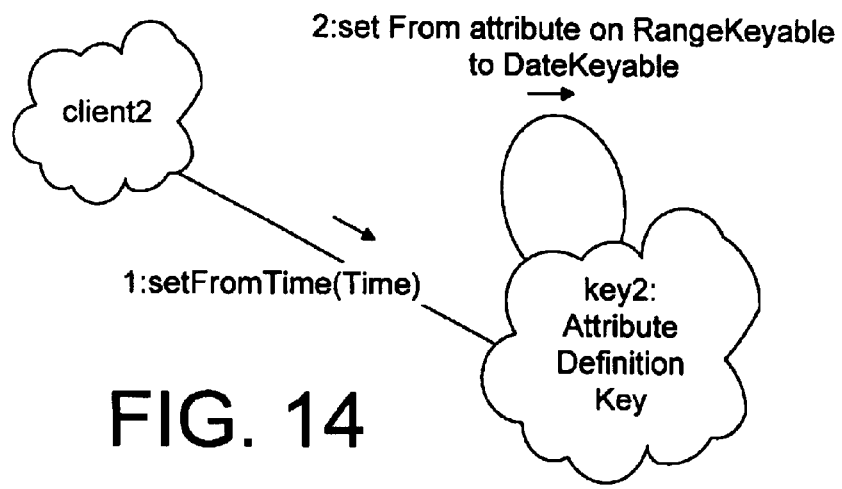
FIG. 14 is an object diagram showing how a time range attribute on an attribute definition key is set.
Figure 15:
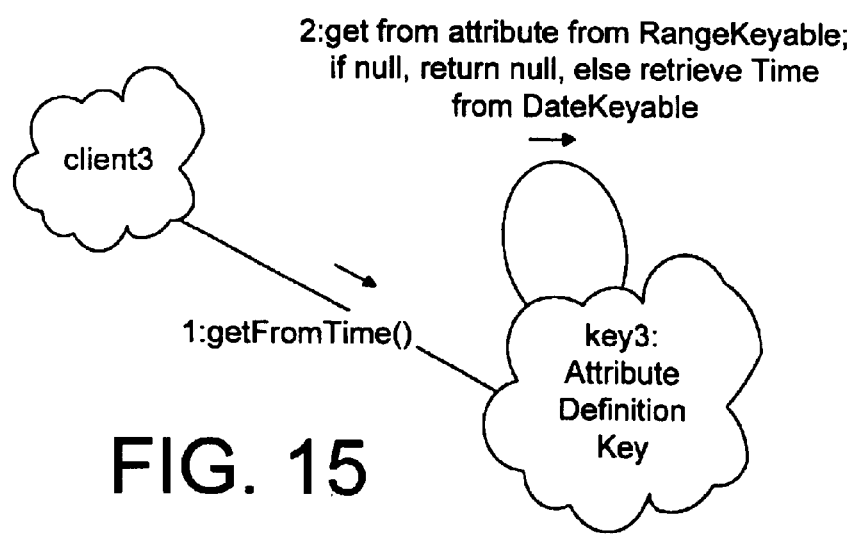
FIG. 15 is an object diagram showing how a time attribute on an attribute definition key is retrieved.

The implementation of the clear, set, and get methods for new time range keyable inputs on the AttributeDefinitionKey class that are defined in step 710 of FIG. 7 is shown in FIGS. 13–15. Referring to FIG. 13, when the clearFromTimeToTime( ) method is invoked on an instance of AttributeDefinitionKey (step 1), the instance sets the keyable position corresponding to the attribute to range keyable with a null in both the fromTime and toTime positions (step 2). This effectively "clears" the time range. Referring to FIG. 14, when the setFromTime( ) method is invoked on an instance of AttributeDefinitionKey specifying a specific time (step 1), the instance sets the From attribute on its range keyable position to datekeyable (step 2), effectively "setting" the "FromTime" to the value passed in as a parameter. Setting the ToTime attribute is done in a similar manner. Referring to FIG. 15, when the getFromTime( ) method is invoked on an instance of AttributeDefinitionKey (step 1), the instance retrieves the From attribute from the range keyable. If the From attribute is null, step 2 returns null. Otherwise, step 2 retrieves the time value from the date keyable corresponding to the From.

Figure 16:
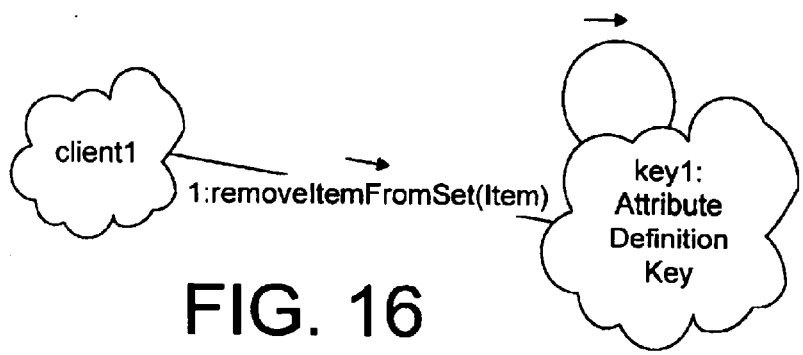
FIG. 16 is an object diagram showing how a set attribute on an attribute definition key is removed from a set.
Figure 17:
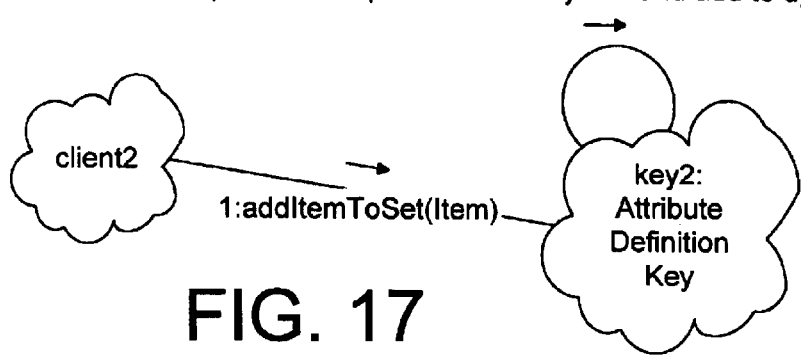
FIG. 17 is an object diagram showing how a set attribute on an attribute definition key is added to a set.
Figure 18:
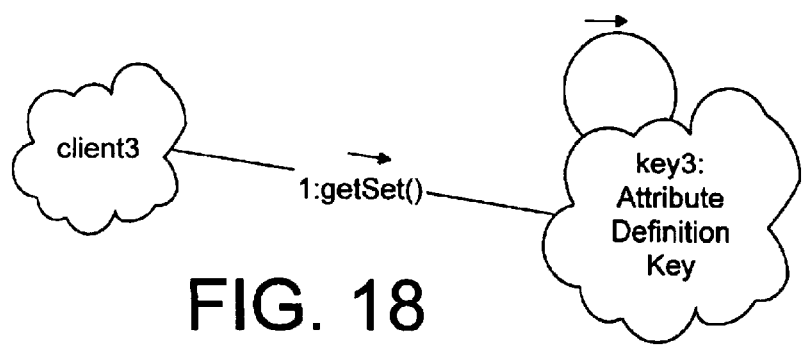
FIG. 18 is an object diagram showing how a set on an attribute definition key is retrieved.
Figure 19:
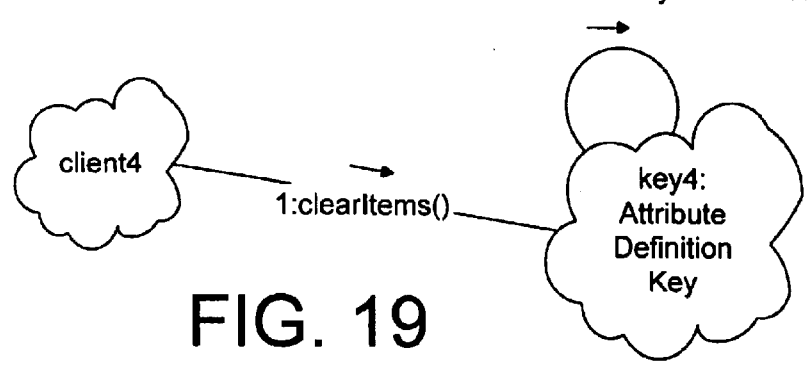
FIG. 19 is an object diagram showing how a set on an attribute definition key is cleared.

The implementation of the get, add, remove and clear methods for new dynamic set keyable inputs on the AttributeDefinitionKey class that are defined in step 720 of FIG. 7 is shown in FIGS. 16–19. Referring to FIG. 16, when the removeItemFromSet( )method is invoked on an instance of AttributeDefinitionKey, passing an item in as a parameter (step 1), the instance finds the item in the dynamic set keyable and removes the item from the dynamic set keyable (step 2). Referring to FIG. 17, when the addItemToSet( ) method is invoked on an instance of AttributeDefinitionKey, passing an item in as a parameter (step 1), the instance puts the item in a specific value keyable and adds the item to the dynamic set keyable (step 2). Referring to FIG. 18, when an item in the set is needed, the getSet( ) method is invoked on an instance of AttributeDefinitionKey (step 1), which returns a copy of all items the set (step 2). Referring to FIG. 19, when the clearItems( ) method is invoked (step 1), all items in the dynamic set keyable are removed (step 2). The methods in FIGS. 16–19 thus provide set support for the AttributeDefinitionKey class.

FIGS. 20–23 show the specific implementations of clear, set, get and restore methods that are defined on the attribute key class in step 810 of FIG. 8. Referring to FIG. 20, the effect of invoking the clearAttribute( ) method (step 1) depends on whether the AttributeKey is a minimum key or an exact key. If the AttributeKey object is a minimum key, the keyable position corresponding to the attribute is set to "ignored". If the AttributeKey object is an exact key, the keyable position is set to "not specified". Referring to FIG. 21, invoking the setAttribute( ) method on an AttributeKey object causes the object to set the keyable position to the appropriate specific value keyable passed as a parameter in the method call (step 2). Referring to FIG. 22, invoking the getAttribute( ) method causes the AttributeKey object to retrieve and return the value for the attribute if the keyable position is a specific value keyable other than "not specified"; otherwise, the AttributeKey object returns null (step 2). Referring to FIG. 23, invoking the restoreAttribute( ) method on an AttributeKey object results in the AttributeKey object setting the keyable position to an appropriate specific value if the initial attribute value is non-null. Otherwise, the keyable position is set to "ignored" if the AttributeKey is a minimum key, and is set to "not specified" if the AttributeKey is an exact key.

Figure 24:
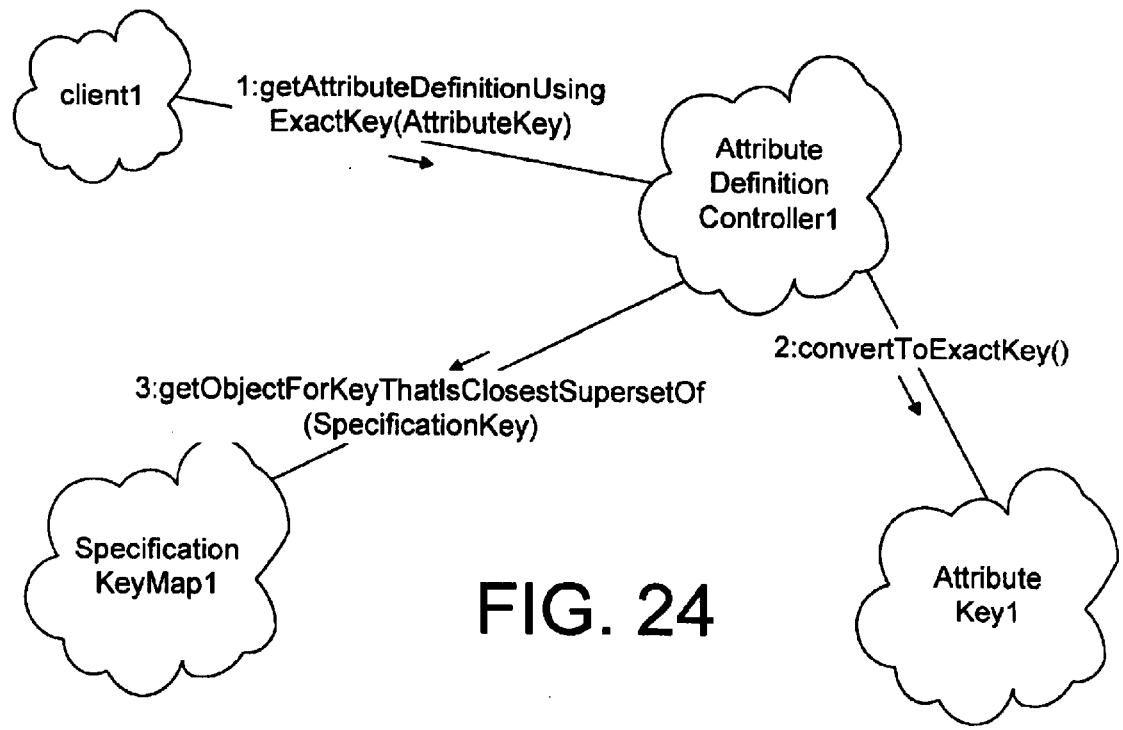
FIG. 24 is an object diagram showing the steps that are performed when a client requests an attribute using an exact key match.

A method for retrieving an attribute using an exact key is shown in FIG. 24. A client program (such as an instance of AttributeRetrievalPolicy), shown as client1 in FIG. 24, first invokes a getAttributeDefinitionUsingExactKey( ) method, passing the AttributeKey as a parameter (step 1). In response, the AttributeDefinitionController invokes the convertToExactKey( ) method on AttributeKey1, which converts AttributeKey1 to an exact key (step 2) by leaving any specific keyables alone and converting any ignored keyables to not specified keyables. Once the key is converted, the AttributeDefinitionController1 invokes the getObjectForKeyThatIsClosestSupersetOf( ) method on the SpecificationKeyMap1 object, passing in a Specification-Key as a parameter (step 3). The SpecificationKeyMap1 object looks at its internal key map for attribute values that correspond to the SpecifiationKey passed to it, if any key/value pair exists for the SpecifiationKey that meet the exact match criteria provide by the AttributeKey1. Any matching attribute value is returned to the AttributeDefinitionController, which then passes the attribute values back to client1.

Figure 25:
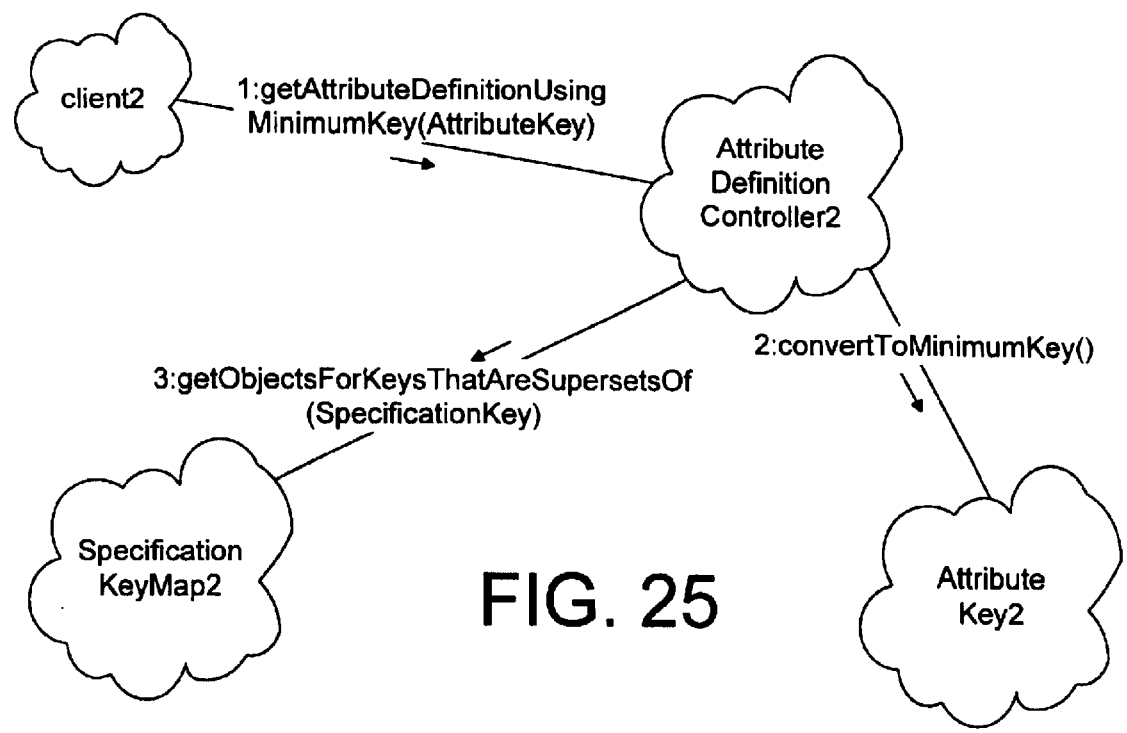
FIG. 25 is an object diagram showing the steps that are performed when a client requests an attribute using a minimum key match.

A method for retrieving an attribute using a minimal key is shown in FIG. 25. A client program, client1 in FIG. 25, invokes a getAttributeDefinitionUsingMinimalKey( ) method on an AttributeDefinitionController2 object, which in turn invokes the convertToMinimumKey( ) method on the AttributeKey2 object, thereby converting the AttributeKey2 to a minimum key (step 2) by leaving any specific keyables alone and converting any not specified keyables to ignored keyables. Next, the AttributeDefinitionController2 object invokes the getObjectsForKeysThatAreSupersetsof( ) method on the SpecificationKeyMap2 object, passing in the SpecificationKey as a parameter (step 3). Objects that satisfy the minimum matching requirement are passed back to the client2.

Figure 26:
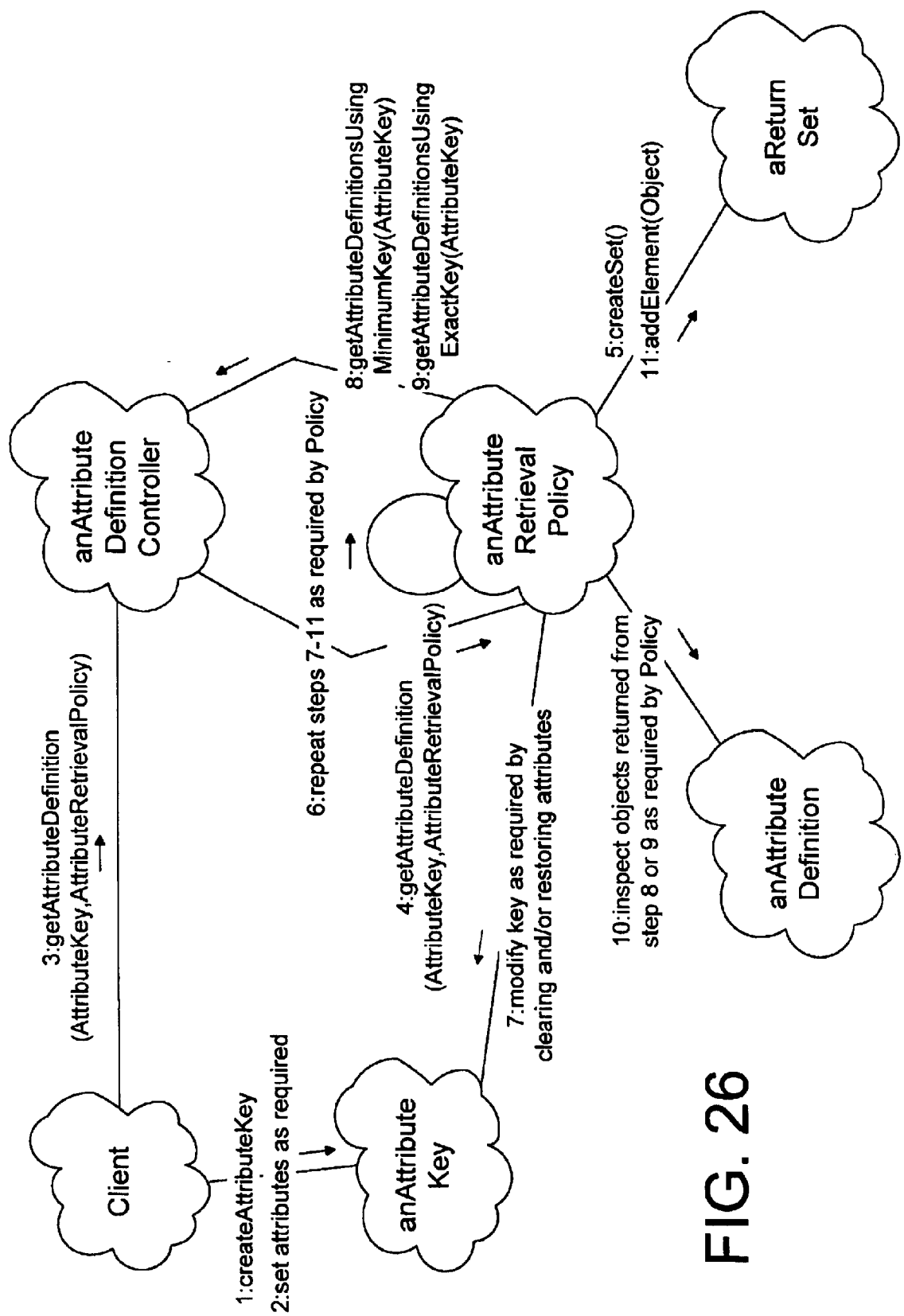
FIG. 26 is an object diagram showing the steps that are performed when a client creates a key and requests to retrieve an attribute based on that key.

FIG. 26 is an object interaction diagram showing the steps for retrieving an AttributeDefinition. First, the client program creates the AttributeKey (step 1), and sets the attributes on the AttributeKey as required (step 2). Next, the client invokes the getAttributeDefinition( ) method on anAttributeDefinitionController, passing the newly-created AttributeKey as a parameter, and optionally passing a specified AttributeRetrievalPolicy that will be used (step 3). In response, the AttributeDefinitionController delegates this method call to the anAttributeRetrievalPolicy object (step 4). This policy object is either passed in step 3, or is the policy held by the AttributeDefinitionController if no policy object is passed in step 3. The next step (step 5) is to create a collection by invoking a createSet( ) constructor method that will create the aReturnSet object, which will serve as a collection for attribute objects. At this point the anAttibuteRetrievalPolicy object takes over, and performs method calls to implement its internal logic that defines the policy. The asAttributeRetrievalPolicy may need to modify the anAttributeKey object by clearing and/or restoring attributes on the key (step 7). The anAttributeRetrievalPolicy object may invoke a method on the anAttributeDefinitionController object that will get attribute definitions based on a minimum key, passing the AttributeKey as a parameter (step 8). In addition, or in the alternative, the anAttributeRetrievalPolicy object may invoke a method on the controller object that will get attribute definitions based on an exact key (step 9). Step 10 allows the policy to determine if the objects returned in steps 8 or 9 match the attribute definition specified in the anAttributeDefinition object. For instance, in the case of a discount retrieval policy, when more than one discount definition is returned to the policy, the policy may choose to return only the highest valued discount definition or it may choose to return all discount definitions. Finally, each object that satisfies the policy and attribute definition is suitably placed within the return set in step 11.

A specific example is presented in FIGS. 27–30 to help clarify how the general concepts discussed above are applied to a particular problem. We assume that we are interested in retrieving values for a price discount, which is the attribute of interest. The various classes of FIG. 27 correspond to their respective classes in FIG. 4, with the "attribute" label replaced by "discount". The primary difference is the Order-ControllerType class, which is used to allow a single design/implementation to be specialized for multiple uses (e.g., sales prices, purchase prices, and internal transfer prices). The DiscountDefinitionController class has a contains relationship with the DiscountDefinition class, the Discount-DefinitionSpecificationKey class, and the DiscountDefinitionPolicy class, indicating that an instance of DiscountDefinitionController will "own" an object from each of these classes.

Figure 28:
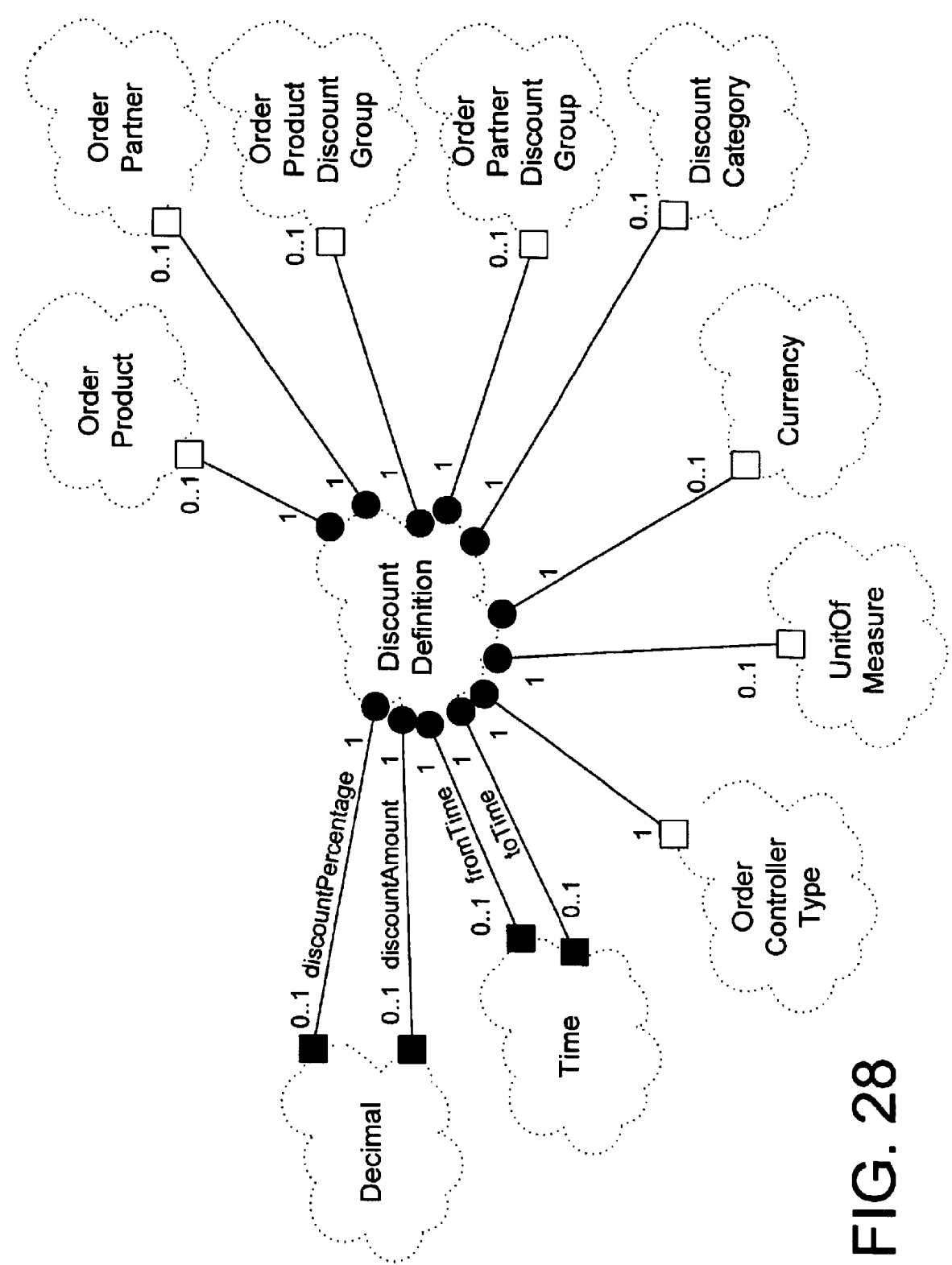
FIG. 28 is a class diagram showing the various attributes that may be included in a DiscountDefinition attribute shown in FIG. 26.

A suitable DiscountDefinition class is shown in FIG. 28, which contains many sub-keys that correspond to inputs of interest. Each of the classes that DiscountDefinition contains is a sub-key with the exception of the Decimal class, which defines the actual discount percentage and/or discount amount values. A framework may define a default Discount-Definition class that may be class replaced or extended by subclassing to generate other user-defined DiscountDefinitions.

Figure 29:
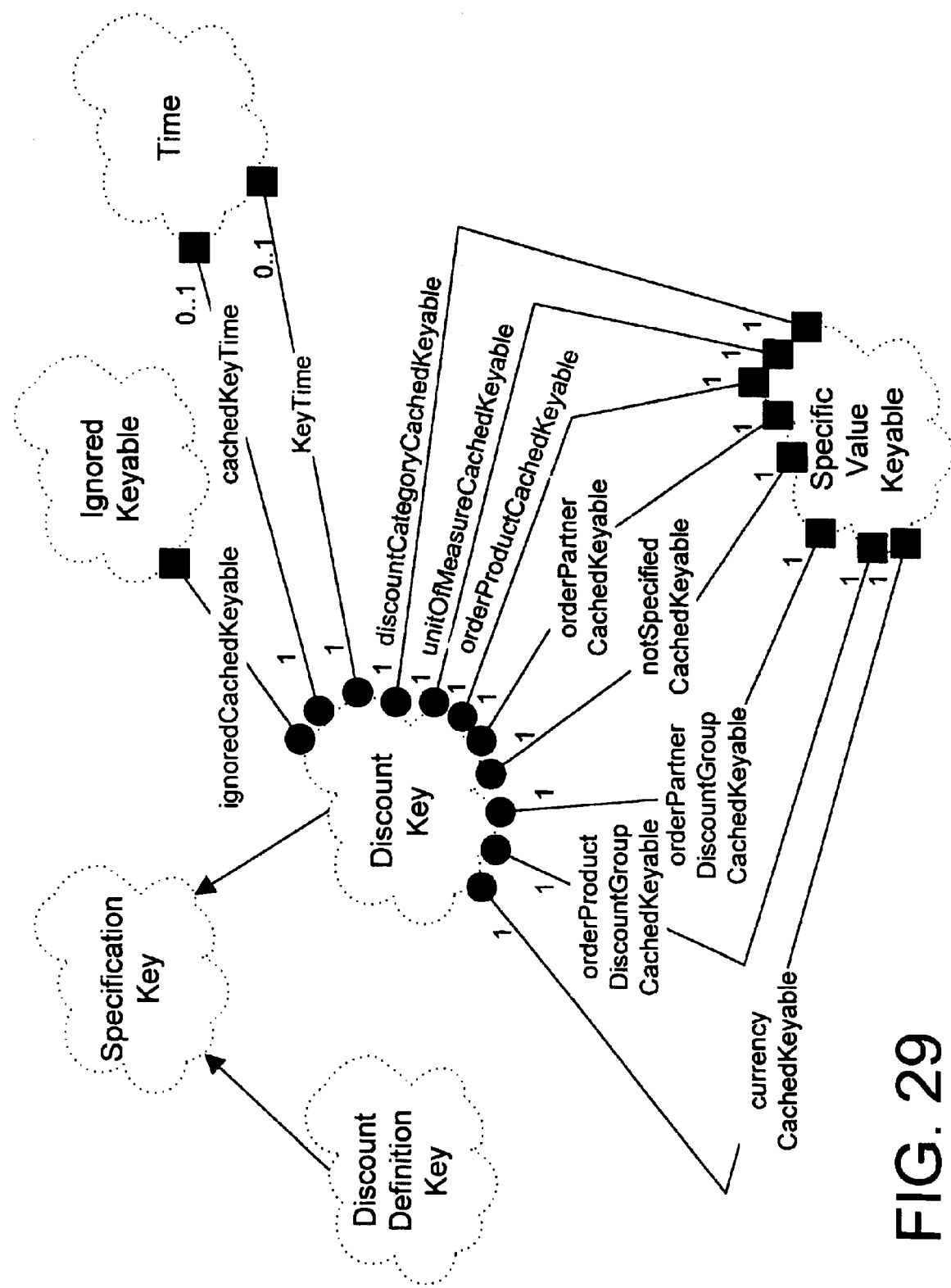
FIG. 29 is a class diagram showing the caching mechanism used for the various keyables that may be included in a DiscountKey attribute shown in FIG. 26.

Referring to FIG. 29, a DiscountKey contains many different inputs that collectively make up the DiscountKey. Each of the SpecificValueKeyables that are contained within the DiscountKey of FIG. 29 corresponds to a class in FIG. 28. Note that FIG. 29 represents a cache configuration for the DiscountKey, allowing the initial state of a DiscountKey to be stored so the DiscountKey can later be reinitialized, if necessary, to its initial state. The actual key mechanisms used for comparison purposes are provided by the base class SpecificationKey implementation.

Figure 27:
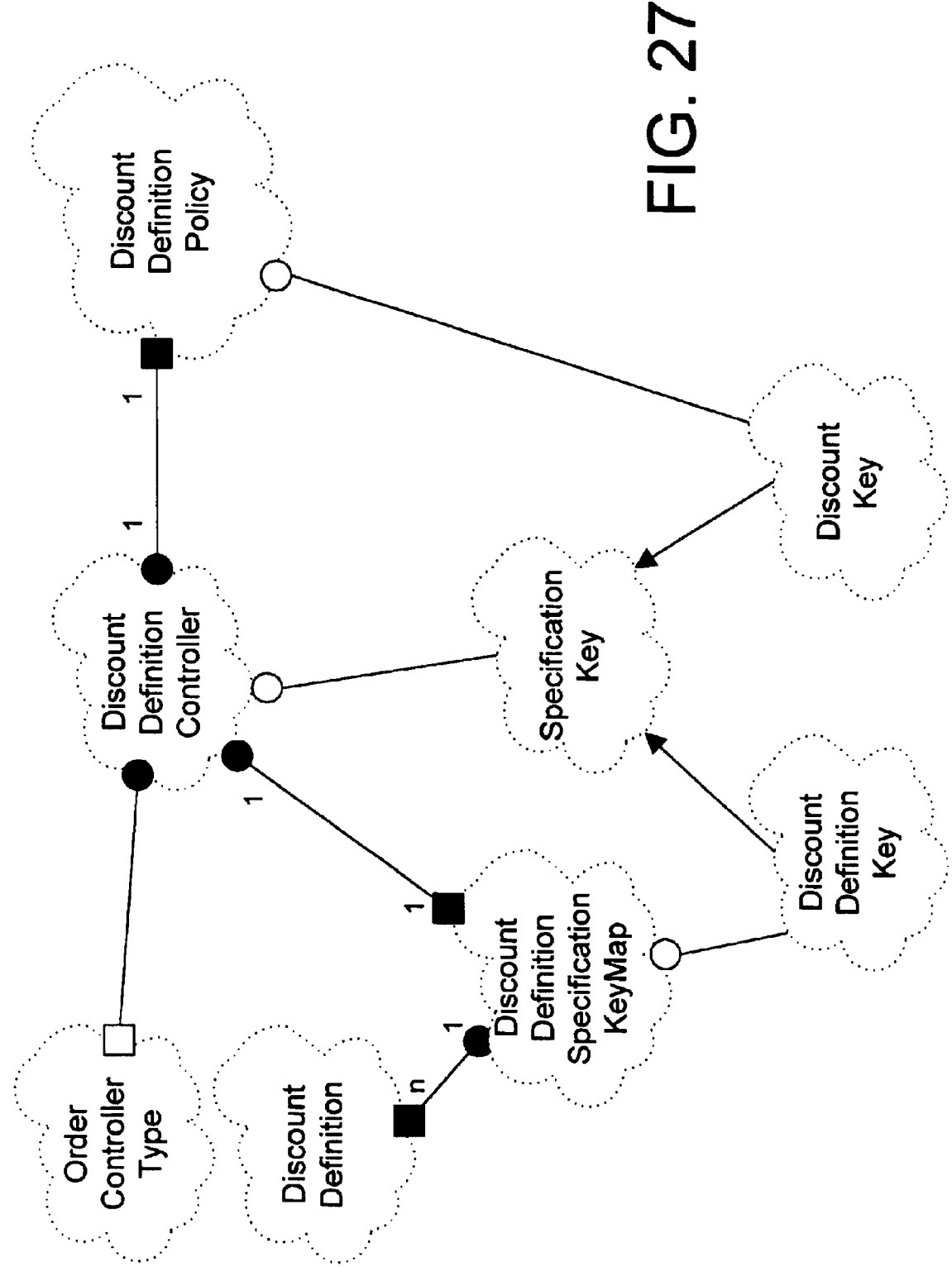
FIG. 27 is a class diagram showing the classes and class relationships for a specific embodiment for determining an appropriate discount in an order processing system.
Figure 30:
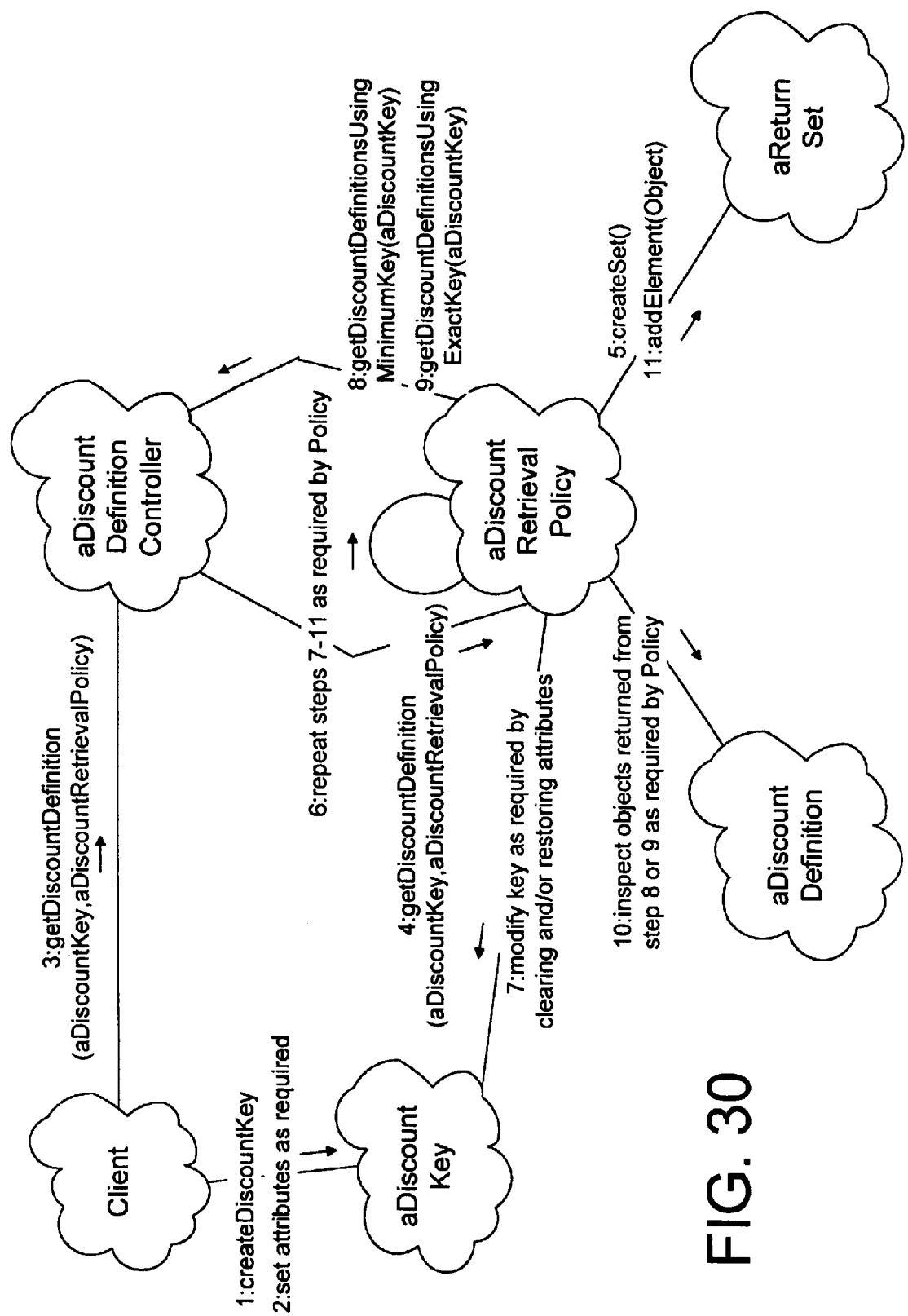
FIG. 30 is an object diagram showing the steps that are performed when a client creates a DiscountKey and requests to retrieve a discount based on the DiscountKey.

FIG. 30 is an object interaction diagram for the classes defined in FIGS. 27–29. Note that these steps correspond to the more general steps in FIG. 26 that have the same step numbers, so the discount definition retrieval in FIG. 30 may be understood with reference to the description of the corresponding steps in FIG. 26. FIGS. 27–30 thus show a flexible method and mechanism for defining attribute keys. The methods and mechanisms of the present invention are especially useful in an object oriented framework.

The classes, objects and methods that define the keyed attribute retrieval mechanism disclosed herein and their interrelationships collectively comprise a means for defining a desired keyed attribute retrieval mechanism.

The preferred embodiments disclosed herein provide the capability to flexibly define attributes of interest in an object oriented framework. By defining a controller class and a definition class, the domain-specific attributes of the keying system are kept separate from the core function of the attribute retrieval system.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
   at least one processor;
   a memory coupled to the at least one processor;
   an object oriented framework mechanism residing in the memory, the object oriented mechanism including:
      a keyed attribute retrieval mechanism that provides a client interface for retrieving a plurality of attributes according to a predefined attribute retrieval policy, the keyed attribute retrieval mechanism defining at least one specification key that specifies a plurality of different types of keyable inputs that may be used as a key for retrieving the plurality of attributes.

2. The apparatus of claim 1 wherein the keyable inputs are independently selected from the group consisting of:
   specific value keyable, all values keyable, ignored keyable, dynamic set keyable, and range keyable.

3. The apparatus of claim 2 wherein the keyable inputs include at least one combination of keyables selected from the group.

4. The apparatus of claim 1 wherein the specification key further specifies at least one set of the inputs.

5. The apparatus of claim 4 wherein the specification key comprises a key class that defines at least one attribute key.

6. The apparatus of claim 1 wherein the object oriented framework mechanism further includes a definition class that defines at least one attribute definition, the attribute definition defining the inputs that comprise the specification key and a value for one of the plurality of attributes corresponding to the specification key.

7. The apparatus of claim 1 wherein the object oriented framework mechanism further includes a definition key class that defines at least one attribute definition key.

8. The apparatus of claim 1 wherein the object oriented framework mechanism further includes a policy class that defines at least one attribute retrieval policy.

9. The apparatus of claim 1 wherein the object oriented framework mechanism further includes a controller class that defines at least one attribute definition controller, the controller class providing a client interface for retrieving the plurality of attributes according to the attribute retrieval policy.

10. The apparatus of claim 9 wherein the controller class contains key/value pairings for the plurality of attributes, contains the attribute retrieval policy, and provides a maintenance interface for changing the plurality of attributes.

11. An apparatus comprising:
   (1) at least one processor;
   (2) a memory coupled to the at least one processor;
   (3) an object oriented order processing framework residing in the memory, the order processing framework including:
      (A) a key class that defines at least one attribute key;
      (B) a definition class that defines at least one attribute definition;
      (C) a definition key class that defines at least one attribute definition key;
      (D) a policy class that defines at least one attribute retrieval policy; and
      (E) a controller class that defines at least one attribute definition controller,
   the controller class providing a client interface for retrieving a plurality of attributes according to the attribute retrieval policy using methods defined on the key class, the definition class, and the definition key class.

12. The apparatus of claim 11 wherein the controller class contains key/value pairings for the plurality of attributes, contains the attribute retrieval policy, and provides a maintenance interface for changing the plurality of attributes.

13. An apparatus comprising:
   a memory; a least one processer coupled to the at least one processer
   an object oriented framework residing in the memory, the object oriented framework including means for defining a desired keyed attribute retrieval mechanism that provides a client interface for retrieving a plurality of attributes according to a predefined attribute retrieval policy, the keyed attribute retrieval mechanism defining at least one specification key that specifies a plurality of different types of keyable inputs that may be used as a key for retrieving the plurality of attributes.

14. A computer implemented method for providing a keyed attribute stored in a memory retrieval mechanism for retrieving a plurality of attributes, the method comprising the steps of:
   defining an attribute retrieval policy;
   defining a controller that provides a client interface for retrieving the plurality of attributes according to the attribute retrieval policy and according to a specification key that specifies a plurality of different types of keyable inputs that may be used as a key for retrieving the plurality of attributes.

15. The method of claim 14 wherein the keyable inputs are independently selected from the group consisting of:
   specific value keyable, all values keyable, ignored keyable, dynamic set keyable, and range keyable.

16. The method of claim 15 wherein the keyable inputs include at least one combination of keyables selected from the group.

17. The method of claim 14 further comprising the step of defining a key class that defines at least one attribute key.

18. The method of claim 17 wherein the key class defines methods to get, set, restore, and clear the plurality of attributes.

19. The method of claim 14 further comprising the step of defining a definition class that defines at least one attribute definition.

20. The method of claim 14 further comprising the step of defining a definition key class that defines at least one attribute definition key.

21. The method of claim 20 wherein the definition key class defines methods to get, set, and clear the plurality of attributes.

22. The method of claim 21 wherein the definition key class further defines methods to get, add, remove, and clear those plurality of attributes, if any, that have group behavior by being stored in at least one set.

23. The method of claim 21 wherein the plurality of attributes includes at least one range for at least one ordered attribute.

24. The method of claim 14 wherein the attribute retrieval policy comprises a policy class.

25. The method of claim 14 wherein the controller comprises a controller class that defines at least one attribute definition controller.

26. A computer readable program product comprising:
   an object oriented framework mechanism including a keyed attribute retrieval mechanism that provides a client interface for retrieving a plurality of attributes according to a predefined attribute retrieval policy, the keyed attribute retrieval mechanism defining at least one specification key that specifies a plurality of different types of keyable inputs that may be used as a key for retrieving the plurality of attributes; and computer readable signal bearing media bearing the framework mechanism.

27. The program product of claim 26 wherein the signal bearing media comprises recordable media.

28. The program product of claim 26 wherein the signal bearing media comprises transmission media.

29. The program product of claim 26 wherein the keyable inputs are independently selected from the group consisting of:

specific value keyable, all values keyable, ignored keyable, dynamic set keyable, and range keyable.

30. The program product of claim 29 wherein the keyable inputs include at least one combination of keyables selected from the group.

31. The program product of claim 26 wherein the specification key further specifies at least one set of the inputs.

32. The program product of claim 31 wherein the specification key comprises a key class that defines at least one attribute key.

33. The program product of claim 26 wherein the object oriented framework mechanism further includes a definition class that defines at least one attribute definition, the attribute definition defining the inputs that comprise the specification key and a value for one of the plurality of attributes corresponding to the specification key.

34. The program product of claim 26 wherein the object oriented framework mechanism further includes a definition key class that defines at least one attribute definition key.

35. The program product of claim 26 wherein the object oriented framework mechanism further includes a policy class that defines at least one attribute retrieval policy.

36. The program product of claim 26 wherein the object oriented framework mechanism further includes a controller class that defines at least one attribute definition controller, the controller class providing a client interface for retrieving the plurality of attributes according to the attribute retrieval policy.

37. The program product of claim 36 wherein the controller class contains key/value pairings for the plurality of attributes, contains the attribute retrieval policy, and provides a maintenance interface for changing the plurality of attributes.

* * * * *

UNITED STATES PATENT AND TRADEMARK OFFICE
CERTIFICATE OF CORRECTION

PATENT NO. : 6,748,594 B1
DATED : June 8, 2004
INVENTOR(S) : James E. Carey et al.

It is certified that error appears in the above-identified patent and that said Letters Patent is hereby corrected as shown below:

<u>Column 20,</u>
Line 4, "a least" should be -- at least --.
Lines 4 and 5, "processer" should be -- processor --.

Signed and Sealed this

Nineteenth Day of October, 2004

JON W. DUDAS
*Director of the United States Patent and Trademark Office*